United States Patent
Blomqvist et al.

(10) Patent No.: US 12,372,356 B2
(45) Date of Patent: Jul. 29, 2025

(54) MEMS GYROSCOPE

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 248 days.

(21) Appl. No.: 17/893,447

(22) Filed: Aug. 23, 2022

(65) Prior Publication Data

US 2023/0085473 A1    Mar. 16, 2023

(30) Foreign Application Priority Data

Sep. 14, 2021  (FI) ...................................... 20215966

(51) Int. Cl.
*G01C 19/5712* (2012.01)
*G01C 19/00* (2013.01)
(Continued)

(52) U.S. Cl.
CPC ....... *G01C 19/5712* (2013.01); *G01C 19/005* (2022.01); *G01C 19/5733* (2013.01); *G01C 19/5747* (2013.01); *G01C 19/5783* (2013.01)

(58) Field of Classification Search
CPC .............. G01C 19/5712; G01C 19/005; G01C 19/5783; G01C 19/5747; G01C 19/5733
(Continued)

(56) References Cited

U.S. PATENT DOCUMENTS

| | | | |
|---|---|---|---|
| 8,813,564 B2 * | 8/2014 | Acar | B81C 1/00134 |
| | | | 73/504.04 |
| 9,352,961 B2 * | 5/2016 | Acar | G01C 19/5712 |

(Continued)

FOREIGN PATENT DOCUMENTS

| | | | | |
|---|---|---|---|---|
| EP | 3671118 A1 * | 6/2020 | ............. | G01C 19/22 |
| EP | 3696501 A1 * | 8/2020 | ......... | G01C 19/5712 |

(Continued)

OTHER PUBLICATIONS

European Search Report dated Apr. 18, 2023, corresponding to European Patent Application No. 22180607.
(Continued)

*Primary Examiner* — Stephanie E Bloss
*Assistant Examiner* — Kevin C Butler
(74) *Attorney, Agent, or Firm* — SQUIRE PATTON BOGGS (US) LLP

(57) ABSTRACT

The invention relates to the field of microelectromechanical systems (MEMS) gyroscopes. The MEMS gyroscope of the present invention drives oscillation of at least one proof mass in a primary drive mode at a first frequency and in a secondary drive mode at a second frequency, different to the first frequency. The primary drive mode and secondary drive mode are orthogonal. Sense circuitry measures oscillation of the at least one proof mass in a sense mode, which is orthogonal to the primary drive mode and the secondary drive mode, in order to determine the angular rate of rotation of the MEMS gyroscope about sense axes parallel to the movement of the at least one proof mass in the primary and secondary drive modes.

20 Claims, 15 Drawing Sheets

(51) Int. Cl.
*G01C 19/5733* (2012.01)
*G01C 19/5747* (2012.01)
*G01C 19/5783* (2012.01)

(58) Field of Classification Search
USPC ........................................................ 73/504.12
See application file for complete search history.

(56) References Cited

U.S. PATENT DOCUMENTS

| | | | | |
|---|---|---|---|---|
| 11,060,866 | B2* | 7/2021 | Blomqvist | G01C 19/574 |
| 2010/0313657 | A1* | 12/2010 | Trusov | G01C 19/5747 |
| | | | | 73/504.16 |
| 2010/0319451 | A1* | 12/2010 | Trusov | B23Q 17/00 |
| | | | | 73/504.12 |
| 2013/0283911 | A1* | 10/2013 | Ayazi | G01C 19/56 |
| | | | | 73/504.12 |
| 2020/0200535 | A1* | 6/2020 | Kuisma | G01C 19/5712 |
| 2020/0263987 | A1* | 8/2020 | Blomqvist | G01C 19/574 |
| 2022/0260372 | A1* | 8/2022 | Geisberger | G01C 19/574 |
| 2023/0085473 | A1* | 3/2023 | Blomqvist | G01C 19/5712 |
| | | | | 73/504.12 |

FOREIGN PATENT DOCUMENTS

| | | | | |
|---|---|---|---|---|
| EP | 3696503 A1 * | 8/2020 | ......... | G01C 19/5712 |
| EP | 4148384 A2 * | 3/2023 | ............ | G01C 19/005 |
| JP | 2020160055 A * | 10/2020 | ......... | G01C 19/5712 |
| WO | WO-2015013827 A1 * | 2/2015 | ............. | G01C 19/56 |
| WO | WO-2015013828 A1 * | 2/2015 | ............. | G01C 19/56 |

OTHER PUBLICATIONS

Finnish Search Report dated Apr. 12, 2022 corresponding to Finnish Patent Application No. 20215966.

* cited by examiner

MEMS GYROSCOPE

TECHNICAL FIELD

The invention relates to the field of microelectromechanical systems (MEMS) gyroscopes.

BACKGROUND

MEMS gyroscopes infer angular rate by measuring the Coriolis force exerted on an oscillating proof mass. Oscillation of the proof mass is driven along a drive axis and measured along a sense axis perpendicular to the drive axis. As the MEMS gyroscope rotates around a rotation axis, which is perpendicular to both the drive and sense axes, the Coriolis force drives oscillation of the proof mass along the sense axis. The amplitude of the oscillation of the proof mass along the sense axis is related to the magnitude of the rate of angular rotation around the rotation axis. The signal derived from the measured oscillation of the proof mass along the sense axis can therefore be seen as the amplitude modulated rate. Such gyroscopes are amplitude modulated (AM) MEMS gyroscopes.

SUMMARY

The MEMS gyroscope of the present invention comprises at least one proof mass connected to a substrate of the MEMS gyroscope via one or more intermediate structures, drive circuitry configured to simultaneously drive oscillation of the at least one proof mass in a primary drive mode at a first frequency and in a secondary drive mode at a second frequency, wherein the primary drive mode and secondary drive mode are orthogonal, and sense circuitry configured to measure oscillation of the at least one proof mass in a sense mode, wherein the sense mode is orthogonal to the primary drive mode and the secondary drive mode. The first frequency is different to the second frequency.

This MEMS gyroscope is particularly advantageous as it is capable of simultaneously sensing rotation about two perpendicular axes using a single proof mass and/or a single sense mode.

Further advantageous features of the invention are defined in the claims.

According to a first aspect, a MEMS gyroscope is provided comprising:
  at least one proof mass connected to a substrate of the MEMS gyroscope via one or more intermediate structures;
  drive circuitry configured to simultaneously drive oscillation of the at least one proof mass in a primary drive mode at a first frequency and in a secondary drive mode at a second frequency, wherein the primary drive mode and secondary drive mode are orthogonal; and
  sense circuitry configured to measure oscillation of the at least one proof mass in a sense mode,
  wherein the sense mode is orthogonal to the primary drive mode and the secondary drive mode;
  wherein the first frequency is different to the second frequency.

According to some aspects, the MEMS gyroscope is configured to output a first rate signal corresponding to the rate of rotation of the MEMS gyroscope around a primary axis, which is parallel to the primary drive mode, and a second rate signal corresponding to the rate of rotation of the MEMS gyroscope around a secondary axis, which is parallel to the secondary drive mode.

According to some aspects, the first rate signal is proportional to amplitude of oscillation of the at least one proof mass in the sense mode at the second frequency; and the second rate signal is proportional to amplitude of oscillation of the at least one proof mass in the sense mode at the first frequency.

According to some aspects, the sense circuitry further comprises demodulation circuitry configured to demodulate the measured oscillation of the at least one proof mass in the sense mode to determine the amplitude of oscillation of the at least one proof mass at the first and second frequencies.

According to some aspects, the at least one proof mass comprises a first proof mass, a second proof mass, a third proof mass and a fourth proof mass, wherein:
  the first and second proof masses are positioned on opposite sides of the centre of mass of the MEMS gyroscope;
  the third and fourth proof masses are positioned on opposite sides of the centre of mass of the MEMS gyroscope;
  the first, second, third and fourth proof masses are arranged around the centre of mass of the MEMS gyroscope at 90-degree intervals; and
  in the primary drive mode, the first, second, third and fourth proof masses are configured to move radially relative to the centre of mass of the MEMS gyroscope.

According to some aspects, in the primary drive mode:
  the radial motion of the first proof mass and the radial motion of the second proof mass are in phase;
  the radial motion of the third proof mass and the radial motion of the fourth proof mass are in phase; and
  the radial motion of the first proof mass and the radial motion of the second proof mass are in antiphase with the radial motion of the third proof mass and the radial motion of the fourth proof mass.

According to some aspects, the radial axes along which each of the first, second, third and fourth proof masses move in the primary drive mode are arranged at 90 degree intervals around the centre of mass of the MEMS gyroscope.

According to some aspects, the drive circuitry comprises a first primary drive actuator and a second primary drive actuator and the one or more intermediate structures comprise a plurality of levers, wherein:
  the first primary drive actuator and second primary drive actuator are positioned on opposite sides of the centre of mass of the MEMS gyroscope and between the first proof mass and the second proof mass;
  the first primary drive actuator and second primary drive actuator are connected to the first and second proof masses such that actuation of the first primary drive actuator and second primary drive actuator drives radial oscillation of the first proof mass and second proof mass in-phase with the movement of the first primary drive actuator and second primary drive actuator; and
  the first primary drive actuator and second primary drive actuator are connected to the third and fourth proof masses via a plurality of levers such that actuation of the first primary drive actuator and second primary drive actuator drives radial oscillation of the third and fourth proof masses in antiphase with the movement of the first primary drive actuator and second primary drive actuator.

According to some aspects, the first primary drive actuator and second primary drive actuator are connected to the first and second proof masses via the plurality of levers.

According to some aspects, the drive circuitry is configured to drive actuation of the first primary drive actuator is in phase with actuation of the second primary drive actuator such that the radial movement of the first primary drive actuator is in-phase with the radial movement of the second primary drive actuator.

According to some aspects, the plurality of levers comprises four levers and wherein: each lever of the four levers comprises two perpendicular straight sections and the four levers are positioned around the first and second primary drive actuators such that, at rest, each lever of the four levers lies at a different vertex of a rectangle or square surrounding the first and second primary drive actuators and the two perpendicular sections of each lever lie on the edges of the rectangle or square;

the one or more intermediate structures further comprises a gimbal structure via which each lever of the four levers is pivotally connected to the substrate at a point between the two perpendicular straight sections of the lever, such that rotation of each lever causes the distal end of one of the perpendicular straight sections of the lever to move radially outwards and the distal end of the other perpendicular straight section of the lever to move radially inwards;

each lever of the four levers is connected to each of its adjacent levers by a spring which couples radial motion of the distal ends of the perpendicular straight sections of adjacent levers;

the first primary drive actuator is connected to a first lever and a second lever of the four levers such that movement of the first primary drive actuator causes the first lever and second lever to rotate in opposite directions; and the second primary drive actuator is connected to a third lever and a fourth lever of the four levers such that movement of the second primary drive actuator causes the third lever and fourth lever to rotate in opposite directions.

According to some aspects, the gimbal structure comprises an inner gimbal and an outer gimbal, wherein:

the inner gimbal is connected to the substrate and allows rotation of components connected to the inner gimbal relative to the substrate along a first component rotation axis;

the outer gimbal is connected to the inner gimbal and allows rotation of components connected to the outer gimbal relative to the inner gimbal along a second component rotation axis, perpendicular to the first component rotation axis;

at rest, the first and second component rotation axes are parallel to the substrate; and the four levers are connected to the outer gimbal structure such that the four levers and first, second, third and fourth proof masses are free to rotate about the first component rotation axis and second component rotation axis.

According to some aspects, the first and second levers are connected to the first proof mass;

the third and fourth levers are connected to the second proof mass;

the second and third levers are connected to the third proof mass; and the first and fourth levers are connected to the fourth proof mass.

According to some aspects, the levers are connected to the proof masses at the distal ends of the perpendicular straight sections of the levers closest to the proof mass.

According to some aspects, in the secondary drive mode:

the first, second, third and fourth proof masses are configured to move essentially tangentially relative to the centre of mass of the MEMS gyroscope;

the tangential motion of the first proof mass and the tangential motion of the second proof mass are in phase;

the tangential motion of the third proof mass and the tangential motion of the fourth proof mass are in phase; and the tangential motion of the first proof mass and the tangential motion of the second proof mass is in antiphase with the tangential motion of the third proof mass and the tangential motion of the fourth proof mass.

According to some aspects, the circuitry comprises four secondary drive actuators and at least one secondary drive connector, wherein:

the four secondary drive actuators are arranged around the centre of mass of the MEMS gyroscope at 90-degree intervals such that one of the four secondary drive actuators is positioned between each pair of the first, second, third and fourth proof masses; and the at least one secondary drive connector connects each of the four secondary drive actuators to the adjacent ones of the first, second, third and fourth proof masses.

According to some aspects, the four secondary drive actuators are configured to move radially;

the drive circuitry is configured to drive radial motion of a first secondary drive actuator of the four secondary drive actuators in-phase with radial motion a second secondary drive actuator of the four secondary drive actuators;

the drive circuitry is configured to drive radial motion of a third secondary drive actuator of the four secondary drive actuators in-phase with radial motion a fourth secondary drive actuator of the four secondary drive actuators; and the drive circuitry is configured to drive radial motion of the first and second secondary drive actuators in antiphase with the radial motion of the third and fourth secondary drive actuators.

According to some aspects, the first secondary drive actuator and second secondary drive actuator are positioned on opposite sides of the centre of mass of the MEMS gyroscope; and the third secondary drive actuator and fourth secondary drive actuator are positioned on opposite sides of the centre of mass of the MEMS gyroscope.

According to some aspects, in the sense mode:

the first and second proof masses define a first sense mode plane, which is capable of rotation out of parallel with the component plane of the MEMS gyroscope about a first sense rotation axis which passes through the centre of mass of the MEMS gyroscope; and the third and fourth proof masses define a second sense mode plane, which is capable of rotation out of parallel with the component plane of the MEMS gyroscope about a second sense rotation axis which passes through the centre of mass of the MEMS gyroscope.

According to some aspects, the first sense rotation axis is coaxial with the radial axis along which the third and fourth proof masses move in the first sense mode; and the second sense rotation axis is coaxial with the radial axis along which the first and second proof masses move in the first sense mode.

According to some aspects, the first, second, third and fourth proof masses are connected to the gimbal structure and rotate out of parallel with the component plane via the gimbal structure.

According to some aspects, the sense circuitry comprises one or more moveable sense electrodes located on each of the first, second, third and fourth proof masses and four or more fixed sense electrodes located on the fixed structure of the MEMS gyroscope; and each of the fixed sense electrodes is located opposite to and overlapping one of the moveable sense electrodes such that movement of the first, second, third and fourth proof masses in the sense mode causes the distance between the moveable and fixed sense electrodes to change.

According to some aspects, the at least one proof mass, one or more intermediate structures, drive circuitry and sense circuitry form a first set of components:
the MEMS gyroscope further comprises a second set of components positioned adjacent to the first set of components on the substrate; and
the at least one proof mass of the first set and at least one proof mass of the second set are configured to oscillate in antiphase in the primary and secondary drive modes.

According to some aspects, the first proof mass of the first set is connected to the first proof mass of the second set by a first beam;
the second proof mass of the first set is connected to the second proof mass of the second set by a second beam; and
the third proof mass of the first set is connected to the fourth proof mass of the second set by a spring.

According to some aspects, the first beam is pivotally connected to the substrate at a point equidistant from the first proof mass of the first set and the first proof of the second set; and the second beam is pivotally connected to the substrate at a point equidistant from the second proof mass of the first set and the second proof of the second set.

According to some aspects, in the primary drive mode:
movement of the first proof mass of the first set along a radial axis extending from the centre of mass of the first set is coupled by the first beam in antiphase with movement of the first proof mass of the second set along a parallel radial axis extending from the centre of mass of the second set; and
movement of the second proof mass of the first set along a radial axis extending from the centre of mass of the first set is coupled by the second beam in antiphase with movement of the second proof mass of the second set along a parallel radial axis extending from the centre of mass of the second set.

According to some aspects, in the sense mode:
movement of the first proof mass of the first set out of the component plane is coupled by the first beam in antiphase with movement of the first proof mass of the second set out of the component plane; and
movement of the second proof mass of the first set out of the component plane is coupled by the second beam in antiphase with movement of the second proof mass of the second set out of the component plane.

According to some aspects, in the secondary drive mode:
movement of the first proof mass of the first set and first proof mass of the second set is not coupled by the first beam; and
movement of the second proof mass of the first set and second proof mass of the second set move is not coupled by the second beam.

According to some aspects, the first beam is connected to the first proof masses of the first and second sets by springs that are stiffer along the axes of oscillation of the first proof masses in the primary drive mode and sense mode than along the axis of oscillation of the first proof masses in the secondary drive mode; and
the second beam is connected to the second proof masses of the first and second sets by springs that are stiffer along the axes of oscillation of the second proof masses in the primary drive mode and sense mode than along the axis of oscillation of the second proof masses in the secondary drive mode.

According to some aspects, in the primary drive mode radial movement of the third proof mass of the first set along a radial axis extending from the centre of mass of the first set is coupled by the spring in antiphase with radial movement of the fourth proof mass of the second set along a radial axis extending from the centre of mass of the second set.

According to some aspects, in the secondary drive mode movement of the third proof mass of the first set and fourth proof mass of the second set is not coupled by the spring.

According to some aspects, in the sense mode movement of the third proof mass of the first set out of the component plane is coupled by spring in phase with movement of the fourth proof mass of the second set out of the component plane.

According to some aspects, the spring coupling the third proof mass of the first set and fourth proof mass of the second set is stiffer along the axes of oscillation of the third proof mass of the first set and fourth proof mass of the second set in the primary drive mode and sense mode than along the axis of oscillation of the proof masses in the secondary drive mode.

According to some aspects, the MEMS gyroscope further comprises at least one counter mass configured to oscillate in antiphase with the at least one proof mass in the primary drive mode and sense mode.

According to some aspects, the at least one counter mass comprises a first counter mass, a second counter mass, a third counter mass and a fourth counter mass; and the counter masses are positioned such that the first proof mass lies between the first counter mass and the centre of mass of the MEMS gyroscope, the second proof mass lies between the second counter mass and the centre of mass of the MEMS gyroscope, the third proof mass lies between the third counter mass and the centre of mass of the MEMS gyroscope, and the fourth proof mass lies between the fourth counter mass and the centre of mass of the MEMS gyroscope.

According to some aspects, in the primary drive mode, the first counter mass oscillates radially in antiphase with the first proof mass along the same radial axis extending from the centre of mass along which the first proof mass oscillates, and the second counter mass oscillates radially in antiphase with the second proof mass along the same radial axis extending from the centre of mass along with the second proof mass oscillates.

According to some aspects, in the sense mode, the first counter mass oscillates in antiphase with the first proof mass, wherein the axis of oscillation of the first counter mass is parallel to the axis of oscillation of the first proof mass, and the second counter mass oscillates in antiphase with the second proof mass, wherein the axis of oscillation of the second counter mass is parallel to the axis of oscillation of the second proof mass.

According to some aspects, each counter mass is connected to one of the proof masses by two intermediate beams, each intermediate beam being connected to the proof mass at a first end of the beam, to the counter mass at the other end of the beam, and pivotally connected to the substrate at a position between the two ends of the beam.

According to some aspects, the intermediate beams are connected to the proof mass by a spring or springs, which are stiffer along the axes of oscillation of the primary drive mode and sense mode than along the axis of oscillation of the secondary drive mode.

According to some aspects, each counter mass is further configured to oscillate in antiphase with the adjacent proof mass in the secondary drive mode.

According to some aspects, in the secondary drive mode, the first counter mass oscillates tangentially relative to a radial axis extending from the centre of mass of the MEMS gyroscope and in antiphase with the first proof mass, and the second counter mass oscillates tangentially relative to a radial axis extending from the centre of mass of the MEMS gyroscope and in antiphase with the second proof mass.

According to some aspects, the MEMS gyroscope further comprises a secondary drive frame, which is connected to the to secondary drive actuators and the counter masses such that radial movement of the secondary drive actuators is coupled to tangential movement of the counter masses.

According to some aspects, the secondary drive frame comprises four secondary drive frame subsections, each subsection comprising:
  a folded beam spring connected at its centre to one of the secondary drive actuators;
  two levers connected at a first end to different ends of the folded beam spring and pivotally connected to the substrate; and
  two spring connectors connected at a first end to the second ends of the levers and at a second end to different counter masses.

According to some aspects, each secondary drive frame subsection has mirror symmetry about a radial axis that extends through the centre of mass of the MEMS gyroscope and the centre of the secondary drive actuator to which the secondary drive frame subsection is connected.

According to some aspects, movement of each secondary drive actuator radially outwards causes the second ends of the levers of the connected secondary drive frame subsection to rotate away from the folded beam spring, causing the spring connectors and counter masses connected to the spring connector to move away from the folded beam spring; and
  movement of each secondary drive actuator radially inwards causes the second ends of the levers of the connected secondary drive frame subsection to rotate towards the folded beam spring, causing the spring connectors and counter masses connected to the spring connectors to move towards the folded beam spring.

DETAILED DESCRIPTION

The invention is a microelectromechanical systems (MEMS) gyroscope, also known as a vibratory gyroscope, in which at least one proof mass is driven to oscillate simultaneously in two orthogonal drive modes at different frequencies. Rotation of the MEMS gyroscope about the sense axes of the gyroscope causes the proof mass to oscillate in a third mode, called the sense mode, orthogonal to both of the drive modes and in proportion to the angular rate of rotation about each sense axis. Oscillation of the proof mass in the sense mode is measured, processed and used to provide an output from the gyroscope indicating the angular rate about each sense axis.

The MEMS gyroscope is formed on top of a planar substrate, the upper surface of which is referred to as the substrate plane. At rest, components of the MEMS gyroscope generally lie in a plane above the upper surface of the substrate, referred to as the component plane. The component plane intersects the mechanical components such as proof masses of the gyroscope when the gyroscope is at rest. Some mechanical components and electrical components, such as sense electrodes, may lie out of the component plane at rest.

Figure 1:
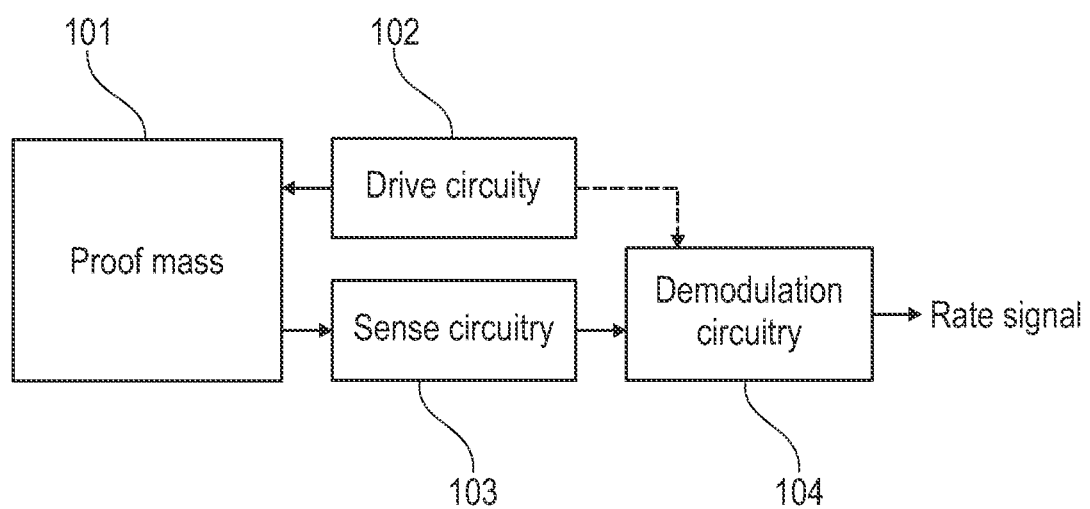
FIG. 1 shows an overview of the MEMS gyroscope of the present invention.

FIG. 1 shows an overview of the MEMS gyroscope 100. The gyroscope 100 includes one or more sense masses 101, oscillation of which is driven simultaneously in two orthogonal drive modes at different frequencies by drive circuitry 102. The two orthogonal drive modes are referred to as the primary drive mode and secondary drive mode. The proof mass oscillates with a first frequency in the primary drive mode and with a second frequency in the secondary drive mode. Oscillation of the proof mass 101 in the sense mode, caused by the driven oscillation and rotation about the sense axes is measured by sense circuitry 103. Demodulation circuitry 104 receives the signal measured by sense circuitry 103 and demodulates the measured oscillation of the proof mass 101 in the sense mode to determine the amplitude of oscillation of the proof mass at the different drive mode frequencies. In other words, signal measured by the sense circuitry 103 includes simultaneously angular rate information of both sense axes. Two rate signals, one on the first frequency and one on the second frequency, are obtained from the signal measured by the sense circuitry 103 by demodulating the signal measured by the sense circuitry.

This can be performed for example by using two different demodulation frequencies, namely the first frequency and the second frequency.

The first and second frequency are preferably near to each other such that both lie within passband of the MEMS gyroscope.

The gyroscope 100 outputs a first rate signal corresponding to the rate of rotation of the gyroscope 100 around a primary sense axis and a second rate signal corresponding to the rate of rotation of the gyroscope 100 around a secondary sense axis. The primary sense axis is parallel to the axis of oscillation of the proof mass 101 in the secondary drive mode and the secondary sense axis is parallel to the axis of oscillation of the proof mass 101 in the primary drive mode. In this way, the axis of oscillation in the sense mode, which must be perpendicular to the sense axes, is the same for both sense axes. The first rate signal is proportional to the amplitude of oscillation of the proof mass 101 in the sense mode at the second frequency, and the second rate signal is proportional to the amplitude of oscillation of the proof mass 101 in the sense mode at the first frequency.

Figure 2:
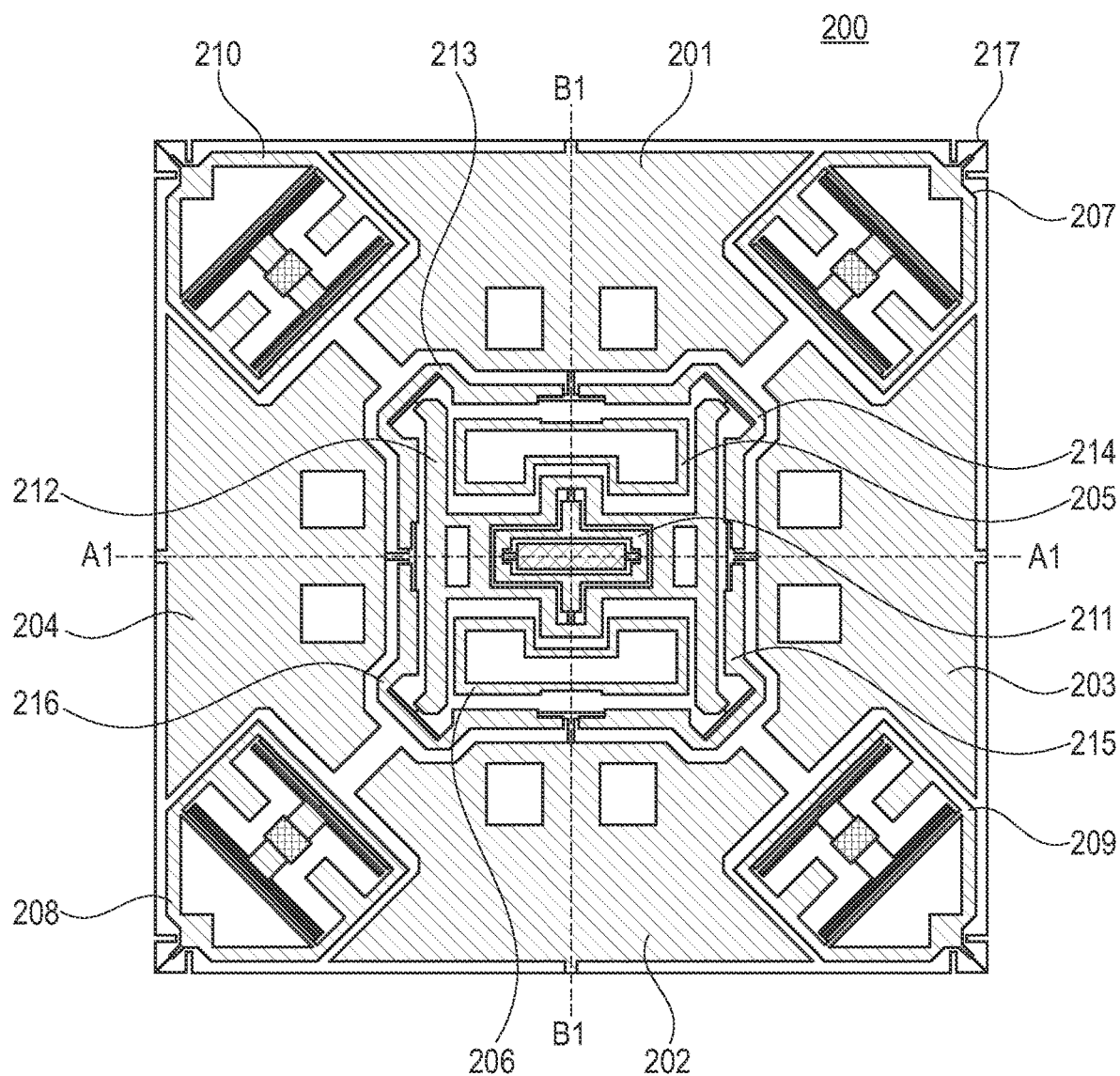
FIG. 2 shows the structure of a MEMS gyroscope according to a first embodiment of the invention.

FIG. 2 shows a MEMS gyroscope 200 according to a first embodiment of the invention. The at least one proof mass 101 shown in FIG. 1 is made up of four proof masses 201, 202, 203, 204. The four proof masses 201, 202, 203, 204 are arranged regularly around the centre of mass of the MEMS gyroscope 200 with four-fold rotational symmetry. The centre of mass of the MEMS gyroscope, as referred to here, is the centre of mass of the functional mechanical components, i.e. the moving structures and masses of the MEMS gyroscope. The centre of mass of the overall package within which the mechanical components are contained, along with electronic circuitry etc. may not be in the same position as the centre of mass of the mechanical components.

The first proof mass 201 is arranged opposite the second proof mass 202 and the third proof mass 203 is arranged opposite the fourth proof mass 204. The first and second proof masses 201, 202 are on opposite sides of the centre of mass of the MEMS gyroscope 200, and the third and fourth proof masses 203, 204 are on opposite sides of the centre of mass of the MEMS gyroscope 200. The first, second, third and fourth proof masses 201, 202, 203, 204 are arranged around the centre of mass of the MEMS gyroscopes at 90-degree intervals.

In the primary drive mode, the four proof masses 201, 202, 203, 204 move radially relative to the centre of mass of the MEMS gyroscope. Radial motion of the proof masses 201, 202, 203, 204 is shown in more detail in FIG. 3. The large arrows show the direction of displacement of the proof masses 201, 202, 203, 204 relative to their at-rest positions. The first proof mass 201 and second proof mass 202 move in phase radially, i.e. as one move outwards, relative to the centre of mass of the MEMS gyroscope, the other also moves outwards and vice versa. The third proof mass 203 and fourth proof mass 204 also move in phase radially. The radial movement of the first and second proof masses 201, 202 in in antiphase with the radial movement of the third and fourth proof masses 203, 204, i.e. as the first and second proof masses 201, 202 move outwards radially, the third and fourth proof masses 203, 204 move inwards radially, and vice versa.

In the primary drive move, the four proof masses 201, 202, 203, 204 move along radial axes A1 and B1. The axes A1 and B1 pass through the centre of mass of the MEMS gyroscope 200 and are perpendicular.

Figure 3:
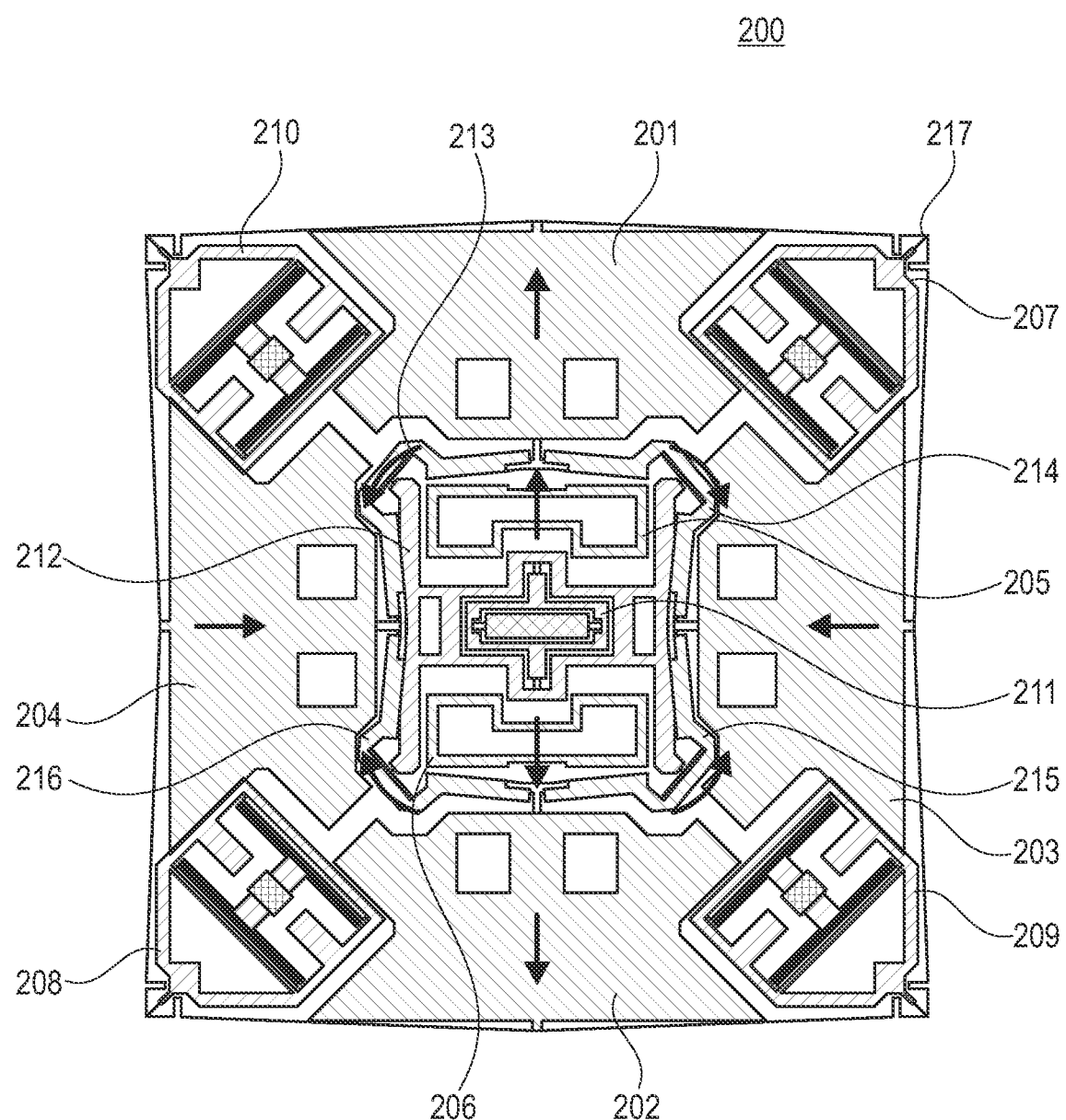
FIG. 3 shows the movement of the structure of the MEMS gyroscope of FIG. 2 in the primary drive mode.

As shown in FIGS. 2 and 3, the MEMS gyroscope 200 includes primary drive actuators 205, 206, which are part of the drive circuitry 102 of FIG. 1. The primary drive actuators 205, 206 are shown in incomplete form in the drawings for the sake of simplicity. Movement of the primary drive actuators 205, 206 along the same radial axes that the first and second proof masses 201, 202 move along is shown in FIG. 3. Movement of the primary drive actuators 205, 206 may be driven by comb capacitors within the interior space of the primary drive actuators 205, 206 shown in the drawings.

Where comb capacitors are used to drive movement of the primary drive actuators 205, 206, moveable comb electrodes of the comb capacitors are attached to a moveable frame and fixed comb electrodes are attached to a fixed frame, the fixed frame being anchored to the substrate of the MEMS gyroscope. The fingers of the comb electrodes of the moveable and fixed frames are interdigitated. By changing the voltage applied to the capacitor, the electrostatic force caused by the difference in voltage between the fixed and moveable comb electrodes changes, driving movement of the moveable frame.

The first primary drive actuator 205 and second primary drive actuator 206 are located on opposite sides of the centre of mass of the MEMS gyroscope 200 between the first proof mass 101 and second proof mass 102. The primary drive actuators 205, 206 are actuated in phase, i.e. as one moves outwards, relative to the centre of mass of the MEMS gyroscope, the other also moves outwards and vice versa. The primary drive actuators 205, 206 are connected to the proof masses 201, 202, 203, 204 such that actuation of the primary drive actuators 205, 206 causes in-phase radial movement of the first proof mass 201 and second proof mass 202, and antiphase radial movement of the third proof mass 203 and fourth proof mass 204. This is achieved by a series of levers 213, 214, 215, 216, which are intermediate structures connected between the primary drive actuators 205, 206 and the proof masses 201, 202, 203, 204. As shown in FIGS. 2 and 3, the primary drive actuators 205, 206 are connected to all of the proof masses 201, 202, 203, 204 via levers 213, 214, 215, 216; however, in alternative arrangement the primary drive actuators 205, 206 may be directly connected to the first and second proof masses 201, 202.

The levers 213, 214, 214, 216 each include perpendicular straight sections, which may be directly connected together or, as shown in FIGS. 2 and 3, may be joined by a middle portion. At rest, the perpendicular straight sections of the levers lie on an imaginary rectangle or square surround the primary drive actuators 205, 206, between the primary drive actuators 206, 206 and the proof masses 201, 202, 203, 204. In this way, each lever lies at one of the four vertices of the imaginary rectangle or square.

The levers 213, 214, 215, 216 are suspended from the substrate via a gimbal structure 211, 212. The gimbal structure is a two-dimensional gimbal that allows rotation of the outer gimbal 212 along both axes A1 and B1. The inner gimbal 211 is connected to an anchor point fixed to the substrate of the MEMS gyroscope by torsion springs which allow the inner gimbal structure 211 to rotate about axis A1 relative to the substrate. The outer gimbal structure 212 is connected to the inner gimbal structure 211 by torsion springs that allow rotation of the outer gimbal structure about the axis B1 relative to the inner gimbal structure. The precise arrangement of gimbal structure is not essential to the invention as long as it allows the kind of rotation of components with respect to the substrate described above.

The outer gimbal structure 212 has an H-shape. Each of the levers 213, 214, 215, 216 is suspended from a different end-point of the H-shape by a spring which allows the lever to pivot within the plane in which the outer gimbal structure 212 lies. The springs connecting the levers 213, 214, 215, 216 to the outer gimbal structure 212 are preferably stiffer in the out-of-plane direction, resisting other types of movement than in-plane movement.

As shown in FIG. 3, rotation of each lever 213, 214, 215, 216 about the pivot causes the distal end of one of the perpendicular straight sections to move with an inward radial component and the other distal end to move with an outward radial component. Each lever 213, 214, 215, 216 is connected to the adjacent levers by a spring, which couples radial motion of the distal ends of the perpendicular straight sections of adjacent levers. The first primary drive actuator 205 is connected the first lever 213 and second lever 214 such that radial movement of the first primary drive actuator 205 causes radial movement of the adjacent distal ends of the first lever 213 and second lever 214, causing the first lever 213 and second lever 214 to rotate in opposite directions. Similarly, the second primary drive actuator 206 is connected to the third lever 215 and fourth lever 216 such that radial movement of the second primary drive actuator 206 causes radial movement of the adjacent distal end of the third lever 215 and fourth lever 216, causing the third lever 215 and fourth lever 216 to rotate in opposite directions.

As shown in FIGS. 2 and 3, the primary drive actuators 205, 206 are connected to the levers 213, 214, 215, 216 by T-shaped springs; however, the precise manner in which the primary drive actuators 205, 206 are connected to the levers 213, 214, 215, 216 is not essential to the invention, as long as the connection drives rotation of the adjacent levers in opposite directions as described above.

The levers 213, 214, 215, 216 are also connected to the proof masses 201, 202, 203, 204 at or close to, i.e. within 10% of the total length of the lever, the distal ends of the perpendicular straight sections. Each pair of adjacent levers 213, 214, 215, 216 is connected to the proof mass closest to the adjacent distal ends of the pair of levers. As shown in FIGS. 2 and 3, the first and second levers 213, 214 are connected to the first proof mass 201, the second and third lever 214, 215 are connected to the third proof mass 203, the third and fourth levers 215, 216 are connected to the second proof mass 202, and the fourth and first levers 216, 213 are connected to the fourth proof mass 204.

The levers 213, 214, 215, 216 may be connected independently to the proof masses, as shown in FIGS. 2 and 3, or may be connected by a common spring. The precise form of the connection between the levers and the proof masses is not essential to the invention as long as radial motion of the levers is coupled to radial motion of the proof masses.

In an alternative embodiment, the proof masses 201, 202, 203, 204 may be coupled to the primary drive actuators 205, 206 by a mechanism that causes all of the proof masses 201, 202, 203, 204 to move radially outwards and radially inwards in phase with one another.

Figure 4:
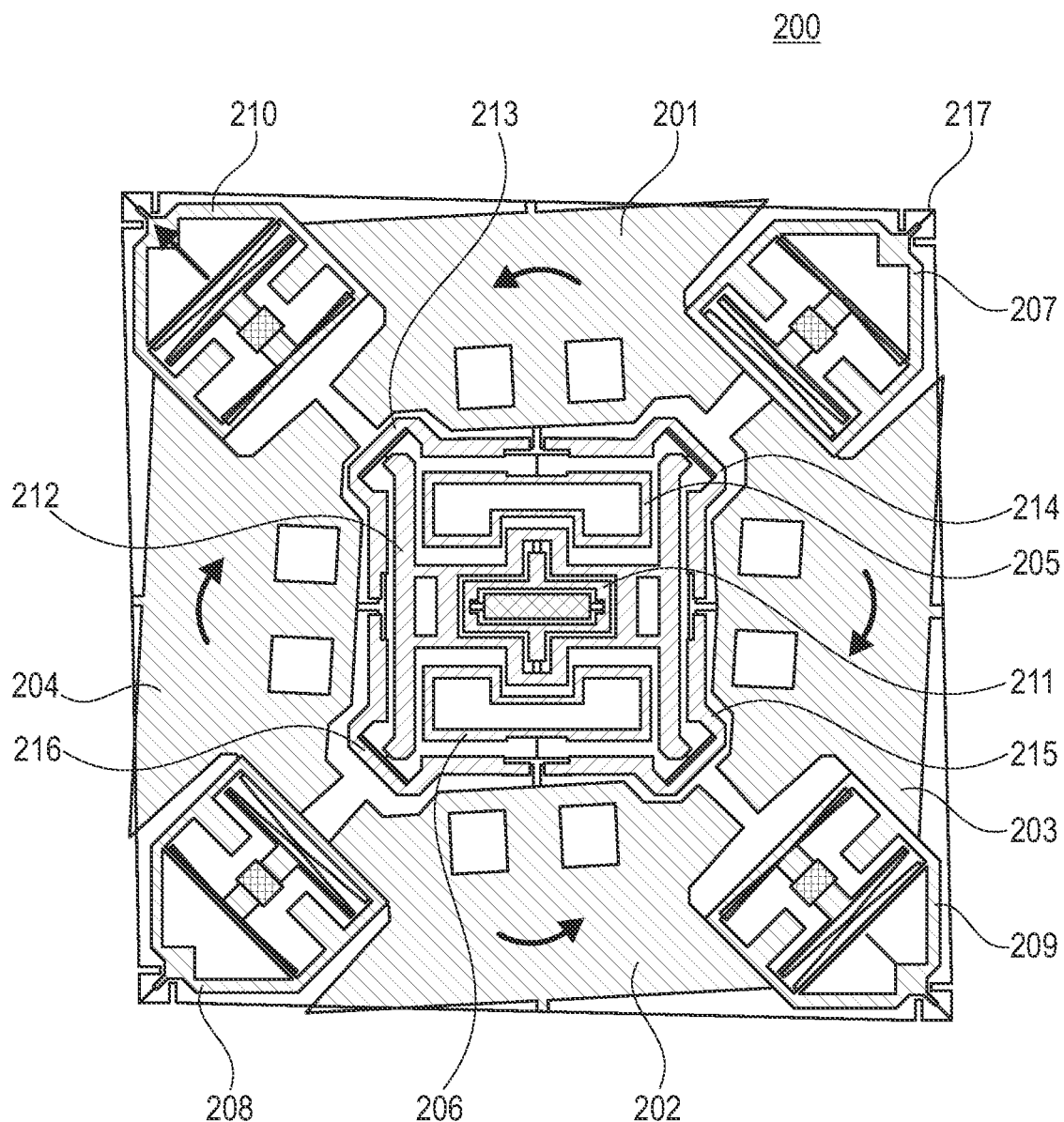
FIG. 4 shows the movement of the structure of the MEMS gyroscope of FIG. 2 in the secondary drive mode.

FIG. 4 shows the motion of the proof masses 201, 202, 203, 204 in the secondary drive mode in more detail. In the secondary drive mode, the first, second, third and fourth proof masses 201, 202, 203, 204 move essentially tangentially relative to the centre of mass of the MEMS gyroscope. It can be seen from FIG. 4 that the actual point about which the proof masses 201, 202, 203, 204 rotate is the point at which they are connected to the levers 213, 214, 215, 216, thus the motion of the proof masses 201, 202, 203, 204 is not strictly tangential relative to the centre of mass of the MEMS gyroscope; however, in the context of the very small amplitude oscillation of the proof masses in the secondary drive mode, the motion is indistinguishable from truly tangential motion. Thus, in this context, "essentially tangential to the centre of mass" means that the largest component of the displacement of the proof masses 201, 202, 203, 204 is perpendicular to a radial axis extending from the centre of mass.

The tangential motion of the first proof mass 201 and the tangential motion of the second proof mass 202 are in phase, i.e. the proof masses 201, 202 rotate in the same direction. Likewise, the tangential motion of the third proof mass 203 and the tangential motion of the fourth proof mass 204 are in phase. The tangential motion of the first and second proof masses 201, 202 and is in antiphase with the tangential motion of the third and fourth proof masses 203, 204.

Movement of the proof masses 201, 202, 203, 204 in the secondary drive mode is driven by secondary drive actuators 207, 208, 209, 210 and at least one secondary drive connector 217. The secondary drive actuators 207, 208, 209, 210 are arranged around the centre of mass of the MEMS gyroscope 200 at 90-degree intervals such that one of the four secondary drive actuators is positioned between each pair of the first, second, third and fourth proof masses. The secondary drive connector 217 connects each of the four secondary drive actuators 207, 208, 209, 210 to the adjacent ones of the first, second, third and fourth proof masses 201, 202, 203, 204. The secondary drive connector 217 may be a single connector connecting all of the secondary drive actuators 207, 208, 209, 210 and proof masses 201, 202, 203, 204 in series, or may instead be a number of separate, smaller connectors that connect each secondary drive actuator 207, 208, 209, 210 to the adjacent proof masses 201, 202, 203, 204, for example. In any case, the secondary drive connector 217 may be, for example, a spring or multiple springs.

The secondary drive actuators 207, 208, 209, 210 are configured to move radially along radial axes extending from the centre of mass of the MEMS gyroscope 200. In FIG. 4, the radial axes along which the secondary drive actuators 207, 208, 209, 210 move are arranged at 45 degree offsets from the axes A1, B1 along which the proof masses 201, 202, 203, 204 move in the primary drive mode. An offset angle of 45 degrees provides symmetry relative to the adjacent proof masses, which simplifies the system, but it is not essential and other angles may be used instead. Different configurations of the secondary drive structures, i.e. the secondary drive actuators and connectors, may be used instead, provided they produce the same motion of the proof masses 201, 202, 203, 204 in the secondary drive mode. For example, separate actuators may be provided to produce motion of the proof masses 201, 202, 203, 204 in horizontal and vertical directions (as seen in the top-down view of the drawings).

The drive circuitry 102 drives radial motion of the first secondary drive actuator 207 in-phase with radial motion of the second secondary drive actuator 208, and drives radial motion of the third secondary drive actuator 209 in-phase with radial motion of the fourth secondary drive actuator 210. The radial motion of the first and second secondary drive actuators 207, 208 is driven in antiphase with the radial motion of the third and fourth secondary drive actuators 209, 210. Other types of drive configurations are also possible, for example in-phase drive motion of all Coriolis masses 201-204 by using e.g. tangential drive actuators.

As the secondary drive actuators 207, 208, 209, 210 move radially outwards, they pull the adjacent proof masses 201, 202, 203, 204 via the secondary drive frame 217, and as the secondary drive actuators 207, 208, 209, 210 move radially inwards, they push the adjacent proof masses 201, 202, 203, 204 via the secondary drive frame. In this way, as each proof mass 201, 202, 203, 204 is connected to two secondary drive actuators 207, 208, 209, 210 that are moving in antiphase, as one secondary drive frame pushes, the other pulls and vice versa, causing the proof mass to oscillate in the secondary drive mode.

Figure 5A:
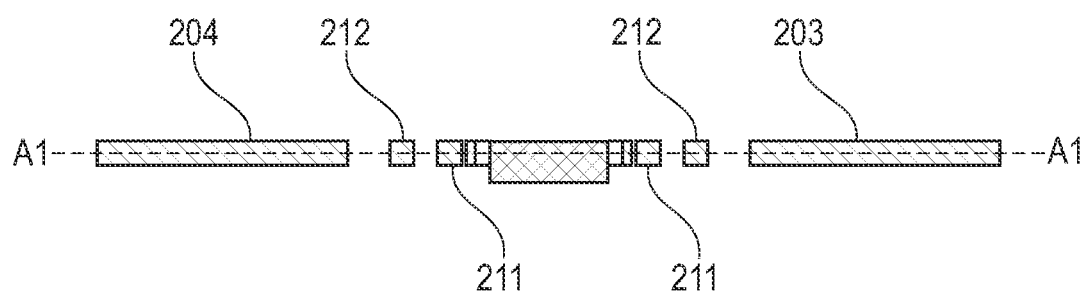
FIGS. 5A and 5B show the movement of the structure of the MEMS gyroscope of FIG. 2 in the sense mode.
Figure 5B:
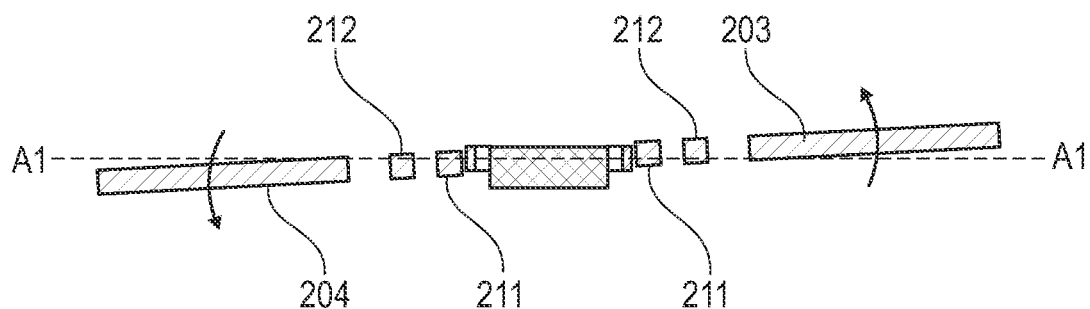

FIGS. 5A and 5B show the movement of the proof masses 203, 204 in the sense mode of oscillation. FIGS. 5A and 5B are cross-sections of the MEMS gyroscope 200 taken along the line A1-A1 shown in FIG. 2. FIG. 5A shows the positions of the proof masses 203, 204, inner gimbal 211 and out gimbal 212 when the MEMS gyroscope is at rest. FIG. 5B shows the rotation of the proof masses 203, 204, inner gimbal 211 and outer gimbal 212 out of the component plane as part of the oscillation of the proof masses in the sense mode. The springs connecting the proof masses to the gimbal structure 211, 212 are stiff in the out-of-plane direction, which leads to the movement of the proof masses 203, 204 and gimbal structure 211, 212 in unison. It will be appreciated that some deformation of the springs in the out-of-plane direction is unavoidable so the movement will not be in perfect unison. The same type of out-of-plane rotation is experienced by the proof masses 201, 202 in the sense mode.

It shall be as rigid as possible for z axis deformations in all cases and move along masses 212, 213. Initially we did not have idea how to use outer masses (211, 214) in tertiary mode. The first and second proof masses 201, 202 therefore rotate about the axis A1-A1 in the sense mode, and the third and fourth proof masses 203, 204 rotate about the axis B1-B1 in the sense mode. In other words, the rotational axis of each proof mass 201, 202, 203, 204 in the sense mode is perpendicular with the radial axes of oscillation in the primary drive mode and parallel to the tangential axis of oscillation in the secondary drive mode.

The sense circuitry 103 of FIG. 1 may include one or more moveable sense electrodes located on each of the first, second, third and fourth proof masses 201, 202, 203, 204 and four or more fixed sense electrodes, one for each of the moveable sense electrodes located on the proof masses 201, 202, 203, 204, located on the fixed structure of the MEMS gyroscope. Each of the fixed sense electrodes is located opposite to and overlapping one of the moveable sense electrodes such that movement of the first, second, third and fourth proof masses 201, 202, 203, 204 in the sense mode causes the distance between the moveable and fixed sense electrodes to change. The capacitance of the capacitor formed by each pair of fixed and moveable electrodes is therefore coupled to the oscillation of the proof masses 201, 202, 203, 204 in the sense mode. The amplitude of the oscillation is related to the magnitude of change in the capacitance by a known relationship and the measured change in capacitance can therefore be used to determine the amplitude of oscillation in the sense mode, which is proportional to the external angular rate applied to the MEMS gyroscope 200. The specific position and arrangement of the sense electrodes may differ from that described above as long as the sense electrodes are sensitive to movement of the proof masses 201, 202, 203, 204 in the sense mode.

Figure 6:
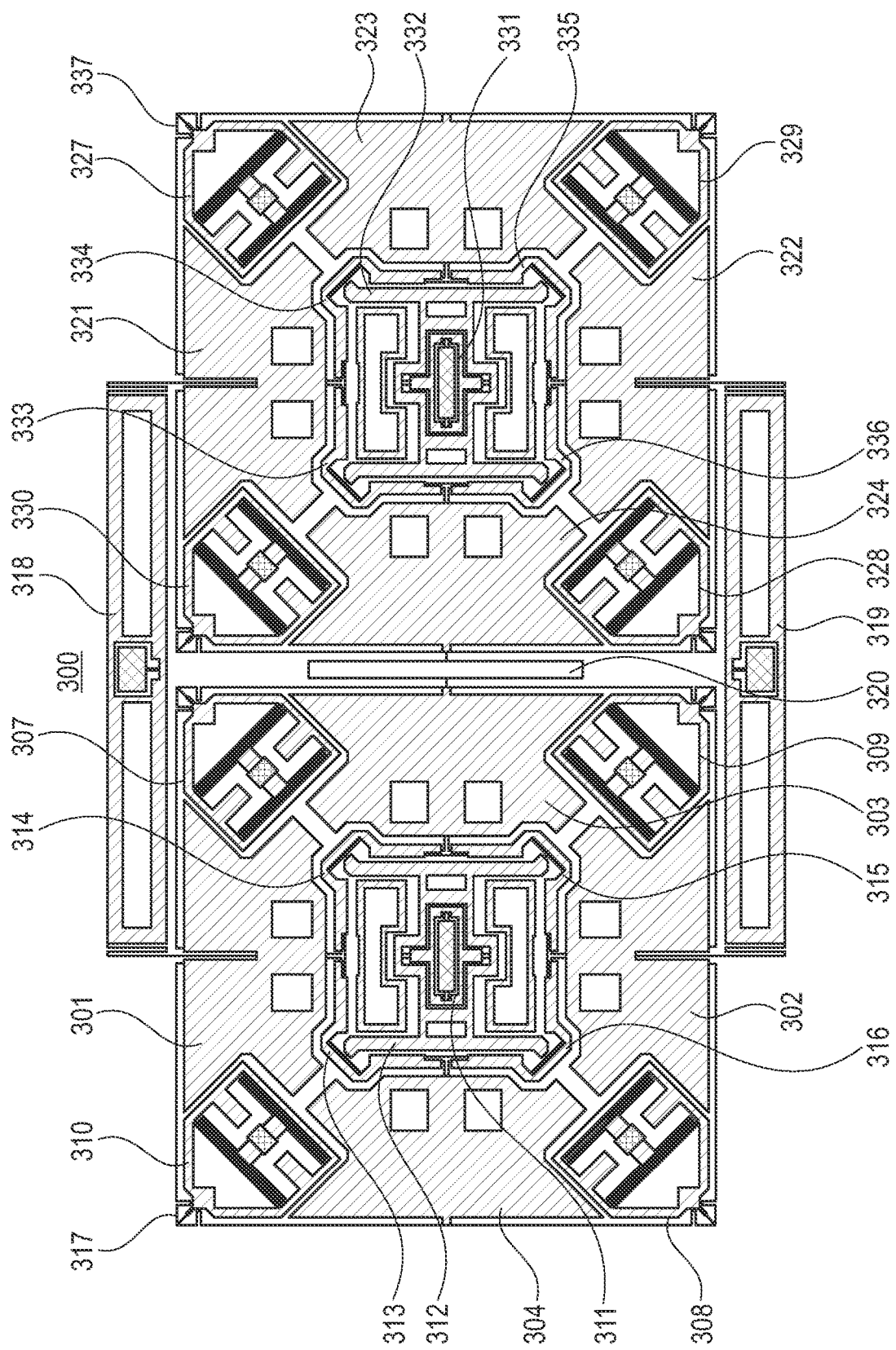
FIG. 6 shows the structure of a MEMS gyroscope according to a second embodiment of the invention.

FIG. 6 shows a MEMS gyroscope 300 according to a second embodiment of the invention. The gyroscope 300 includes two sets of the components 301-317 and 321-337 of the gyroscope 200 shown in FIGS. 2 to 5. The two sets of components are arranged side-by side and are connected by beam structures 318, 319 and spring 320. The first proof mass 301 of the first set is connected to the first proof mass 321 of the second set by a first beam 318, the second proof mass 302 of the first set is connected to the second proof mass 322 of the second set by a second beam 319, and the third proof mass 303 of the first set is connected to the fourth proof mass 324 of the second set by the spring 320. The first and second beams 318, 319 are each pivotally anchored to the substrate at a mid-point of the beam such that the beam acts as a see-saw. The first proof mass 301 of the first set is connected to the first beam 318 on one side of the pivot and the first proof mass 321 of the second set is connected to the first beam 318 on the other side of the pivot. The proof masses 301, 321 are connected to the beam 318 by springs which are stiffer in the direction of oscillation of the proof masses 301, 321 in the primary drive mode than in the direction of oscillation of the proof masses 301, 321 in the secondary drive mode. This stiffness in the direction of the primary drive mode couples oscillation of the first proof masses 301, 321 in antiphase in the primary drive mode via the first beam 321, while the relatively lower stiffness in the direction of the secondary drive mode does not couple oscillation of the first proof mass 301, 321 in the secondary drive mode, allowing them to also oscillate in antiphase in the secondary drive mode. The configuration of the second proof masses 302, 322 of the first and second sets with the second beam 319 is the same as configuration of the first proof masses 301, 321 of the first and second sets with the first beam 318 described above.

The spring 320 connects the third proof mass 303 of the first set with the fourth proof mass 324 of the second set. The third proof mass 303 of the first set and fourth proof mass 324 oscillate radially in antiphase, with respect to the centre of mass of their respective sets of components. However, since the third proof mass 303 of the first set and fourth proof mass 324 of the second set are located between the centres of mass of the two sets of components, the proof masses 303, 324 move in the same direction. The spring 320 therefore couples movement of the third proof mass 303 of the first set with movement of the fourth proof mass 324 of the second set in the primary drive mode.

Figure 7:
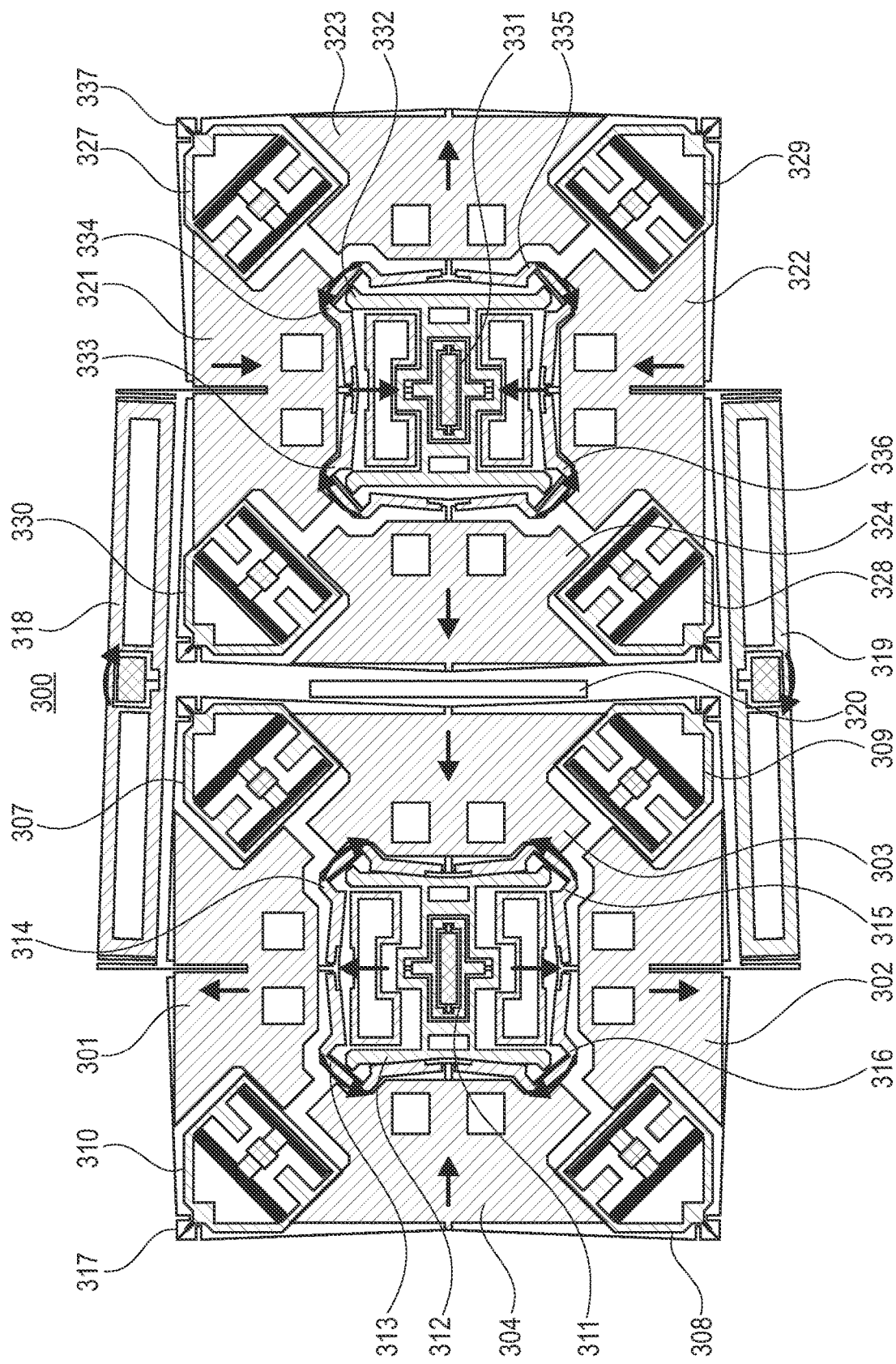
FIG. 7 shows the movement of the structure of the MEMS gyroscope of FIG. 6 in the primary drive mode.

FIG. 7 shows the movement of the proof masses 301-304 and 321-324, the beams 318, 319 and the spring 320 in the primary drive mode. The corresponding proof masses of each set, i.e. the first proof masses 301, 321, second proof masses 302, 322, third proof masses 303, 323 and fourth proof masses 304, 324 are configured to oscillated in antiphase in the primary and secondary drive modes. Movement of the first proof mass 391 of the first set along a radial axis extending from the centre of mass of the first set is coupled by the first beam 318 in antiphase with movement of the first proof mass 321 of the second set along a parallel radial axis extending from the centre of mass of the second set. In other words, as the first proof mass 301 of the first set moves radially outwards, the first proof mass 321 of the second set moves radially inwards and vice versa. Movement of the second proof mass 302 of the first set along a radial axis extending from the centre of mass of the first set is coupled by the second beam 319 in antiphase with movement of the second proof mass 322 of the second set along a parallel radial axis extending from the centre of mass of the second set.

The first and second beams 318, 319 and the spring 320 also couple movement of the proof masses in the sense mode. Movement of the first proof mass 301 of the first set out of the component plane is coupled by the first beam 318 in antiphase with movement of the first proof mass 321 of the second set out of the component plane. Movement of the second proof mass 302 of the first set out of the component plane is coupled by the second beam 319 in antiphase with movement of the second proof mass 322 of the second set out of the component plane. In the sense move, the beams 318, 319 therefore tilt out of parallel with the component plane about the pivot point to couple the antiphase movement of the proof masses out of the component plane.

Figure 8:
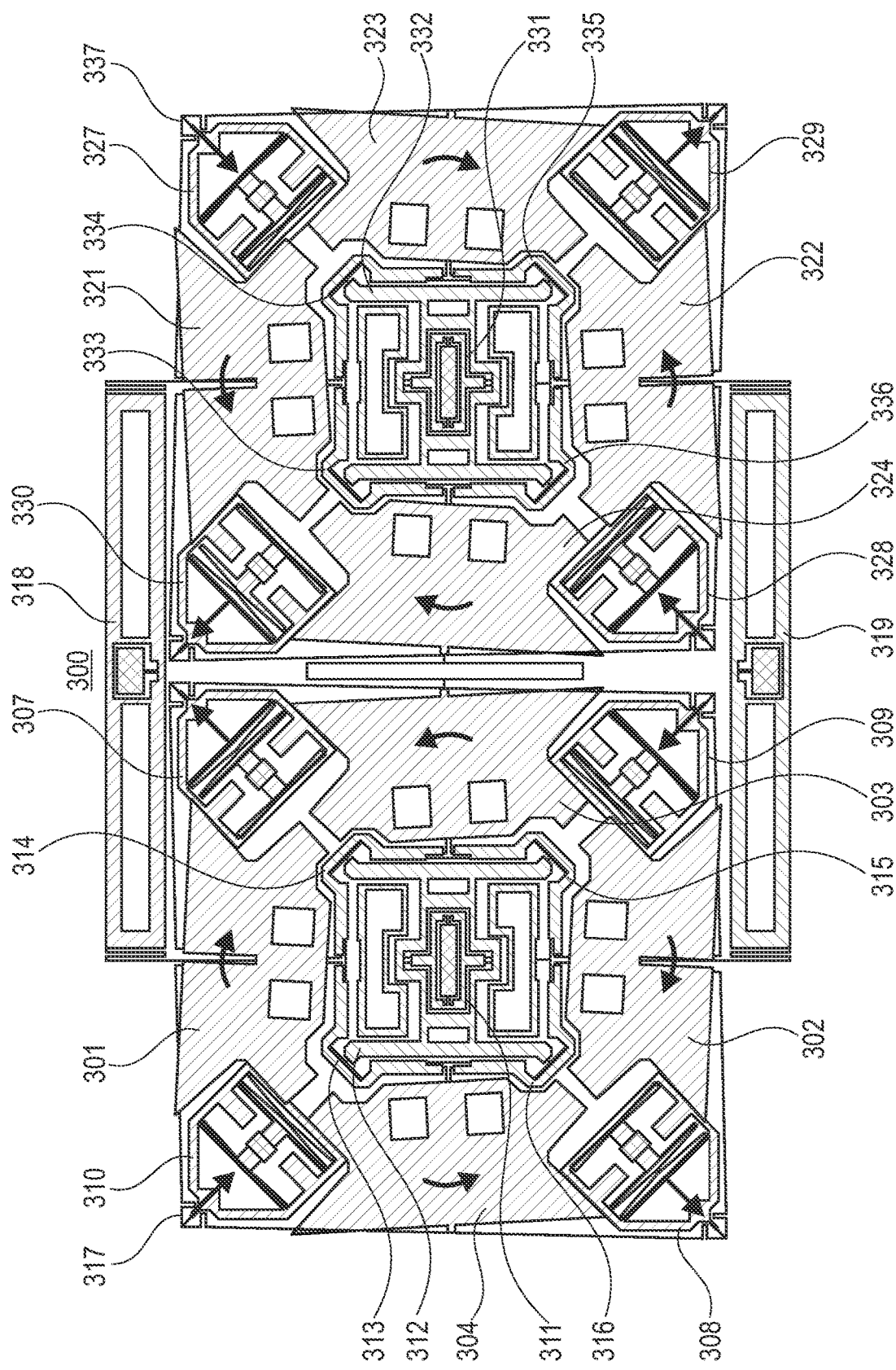
FIG. 8 shows the movement of the structure of the MEMS gyroscope of FIG. 6 in the secondary drive mode.

FIG. 8 shows the movement of proof masses 301-304 and 321-324 in the secondary drive mode. Each of first proof masses 301-304 of the first set moves in antiphase with the corresponding proof mass 321-324 of the second set in the secondary drive mode, i.e. one proof mass moves clockwise relative to the centre of mass of its set of components and the other proof mass moves anticlockwise relative to the centre of mass of its set of components. The springs connecting the first proof masses 301, 321 of the first and second sets to the first beam 318 and the second proof masses 302, 322 of the first and second sets to the second beam 319 are less stiff in the direction parallel to the beams 318, 319, i.e. in the direction of movement of the first and second proof masses 301, 321, 302, 322 in the secondary drive mode, compared to the direction of movement in the primary drive mode and sense mode. Movement of the proof masses in the secondary drive mode is therefore not coupled by the beams 318, 319. To further reduce the stiffness of the springs connecting the proof masses 301, 321, 302, 322 to the beams 318, 319, the springs may be connected to the proof masses within a recess in the proof mass, thereby extending the length of the springs in the direction perpendicular to the direction of movement in the secondary drive mode.

In the sense mode, movement of the proof masses 301-304, 321-324 of each set is the same as described above with respect to the first embodiment and shown in FIG. 5. In this embodiment, as the primary drive mode and secondary drive mode of the first set of components is in antiphase with the primary drive mode and secondary drive mode of the second set of components, the oscillation of the proof masses 301-304 of the first set is also in antiphase with the oscillation of the proof masses 321-324 of the second set in the sense mode. Due to the relative out of plane stiffness of the spring coupling the proof masses 301, 321, 302, 322 to the beams 318, 319 and the spring coupling the third proof mass 303 of the first set to the fourth proof mass 324 of the second set, the out of plane oscillation of the first proof masses 301, 321 is coupled by the first beam 318, the out of plane oscillation of the second proof masses 302, 322 is coupled by the second beam 319, and the out of plane oscillation of the third proof mass of the first set 303 is coupled by the spring 320 to the out of plane oscillation of the fourth proof mass 324 of the second set.

Figure 9:
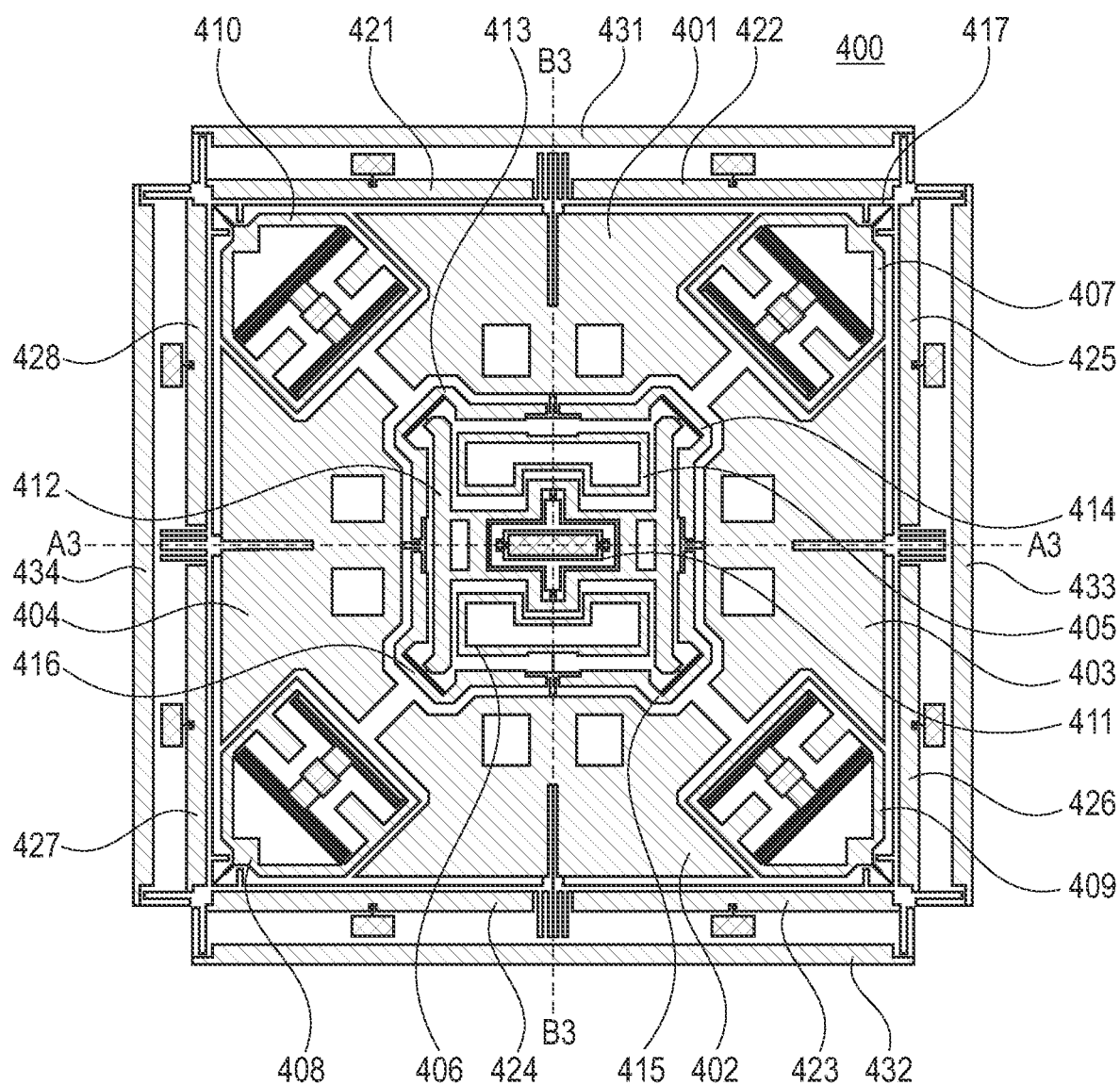
FIG. 9 shows the structure of a MEMS gyroscope according to a third embodiment of the invention.

FIG. 9 shows a third embodiment of the invention in which the MEMS gyroscope 400 corresponds to the MEMS gyroscope 100 of the first embodiment, with the addition of counter masses 431-434 arranged towards the exterior of the MEMS gyroscope 400 relative to the other mechanical components. Each counter masses 431-434 is associated with one of the proof masses 401-404 and oscillates in antiphase with the associated proof mass 401-404 in the primary drive mode and in the sense mode.

The counter masses 431-434 are positioned such that the first proof mass 401 lies between the first counter mass 431 and the centre of mass of the MEMS gyroscope 400, the second proof mass 402 lies between the second counter mass 432 and the centre of mass of the MEMS gyroscope 400, the third proof mass 402 lies between the third counter mass 433 and the centre of mass of the MEMS gyroscope 400, and the fourth proof mass 404 lies between the fourth counter mass 434 and the centre of mass of the MEMS gyroscope 400.

In the primary drive mode, each counter mass 431-434 oscillates radially in antiphase with the corresponding proof mass 401-404 along the same radial axis extending from the centre of mass along which the corresponding proof mass 401-404 oscillates.

In the sense mode, each counter mass 431-434 oscillates in antiphase with the corresponding proof mass 401-404 with the axis of oscillation of the counter mass 431-434 is parallel to the axis of oscillation of the proof mass 401-404.

Each counter mass 431-434 is connected to the corresponding proof mass 401-404 by two intermediate beams 421-428, each intermediate beam 421-428 being connected to the proof mass 401-404 at a first end of the beam, to the counter mass 431-434 at the other end of the beam, and pivotally connected to the substrate at a position between the two ends of the beam.

The intermediate beams 421-428 are connected to the proof mass by a spring or springs, which are stiffer along the axes of oscillation of the primary drive mode and sense mode than along the axis of oscillation of the secondary drive mode. The movement of the intermediate beams 421-428 is thereby coupled to the movement of the proof masses 401-404 in the primary drive mode and sense mode, and not coupled, or more weakly coupled, with the movement of the proof masses 401-404 in the secondary drive mode. Each intermediate beams 421-428 is connected to the counter mass 431-434 by a spring or springs, which may also be stiffer along the axes of oscillation of the primary drive mode and sense mode than along the axis of oscillation of the secondary drive mode. While movement of the beams 421-428 is decoupled or only weakly coupled to the oscillation of the proof masses 401-404 in the secondary drive mode, the lower stiffness of the springs connecting beams 421-428 to the counter masses 431-434 allows some motion of the end of the beam 421-428 connected to the counter mass 431-434 relative to the counter mass 431-434, which occurs when the beam 421-428 rotates.

Figure 10:
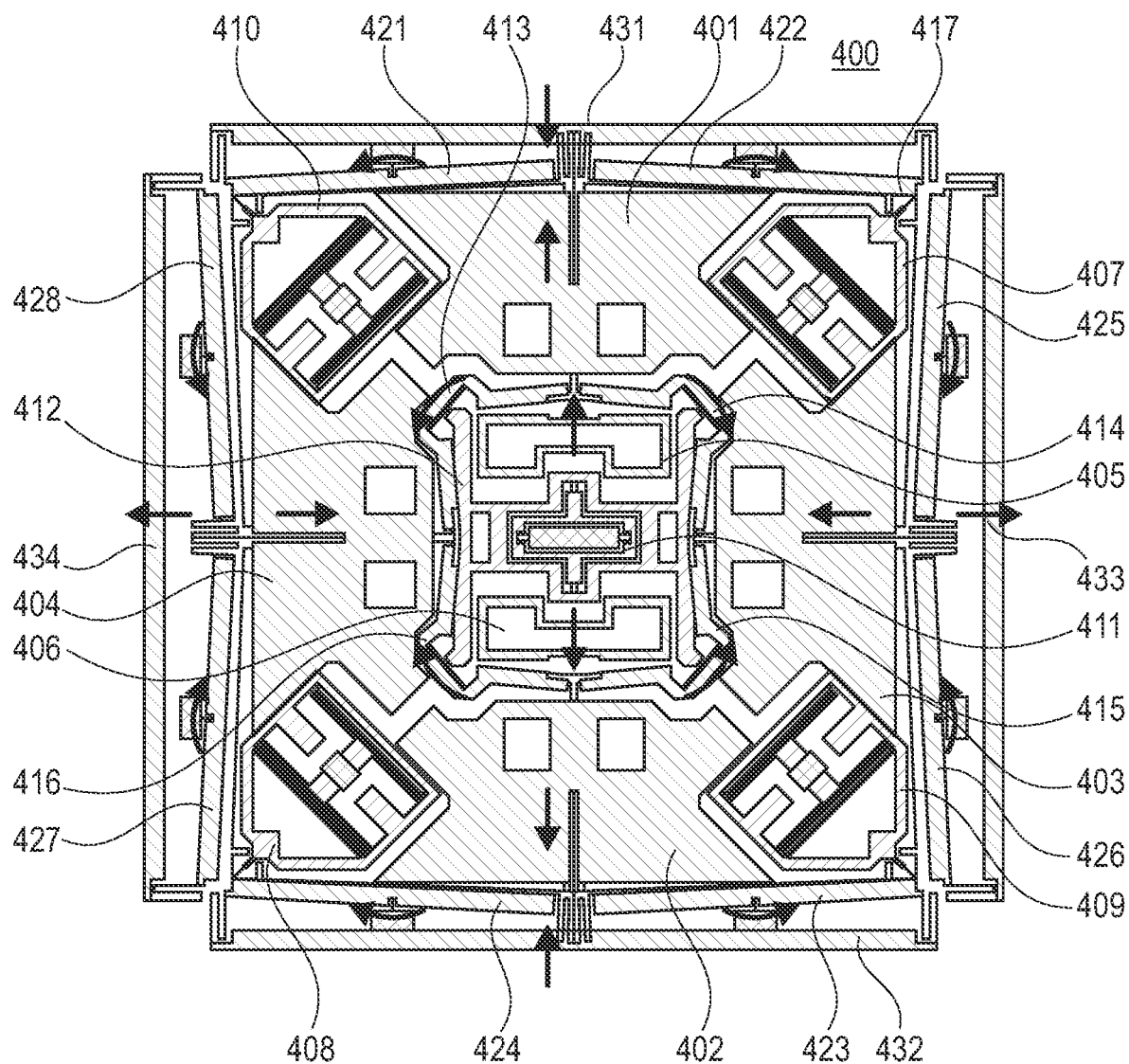
FIG. 10 shows the movement of the structure of the MEMS gyroscope of FIG. 9 in the primary drive mode.

Movement of the proof masses 401-404 and counter masses 431-434 in the primary drive mode is shown in more detail in FIG. 10. In the primary drive mode, as each proof mass 401-404 oscillates along the radial axis extending through the centre of mass of the MEMS gyroscope 400, the connected intermediate beams 421-428 are driven to rotate about the pivotal connection to the substrate. Therefore, as the end of each intermediate beam 421-428 that is connected to the proof mass 401-404 moves away from the centre of mass of the MEMS gyroscope 400, the end that is connected to the counter mass 431-434 move towards the centre of mass of the MEMS gyroscope 400 and vice versa. In this way, the movement of each counter mass 431-434 in the primary drive mode is coupled in antiphase with the movement of corresponding proof mass 401-404 via the beams 421-428.

Figure 11:
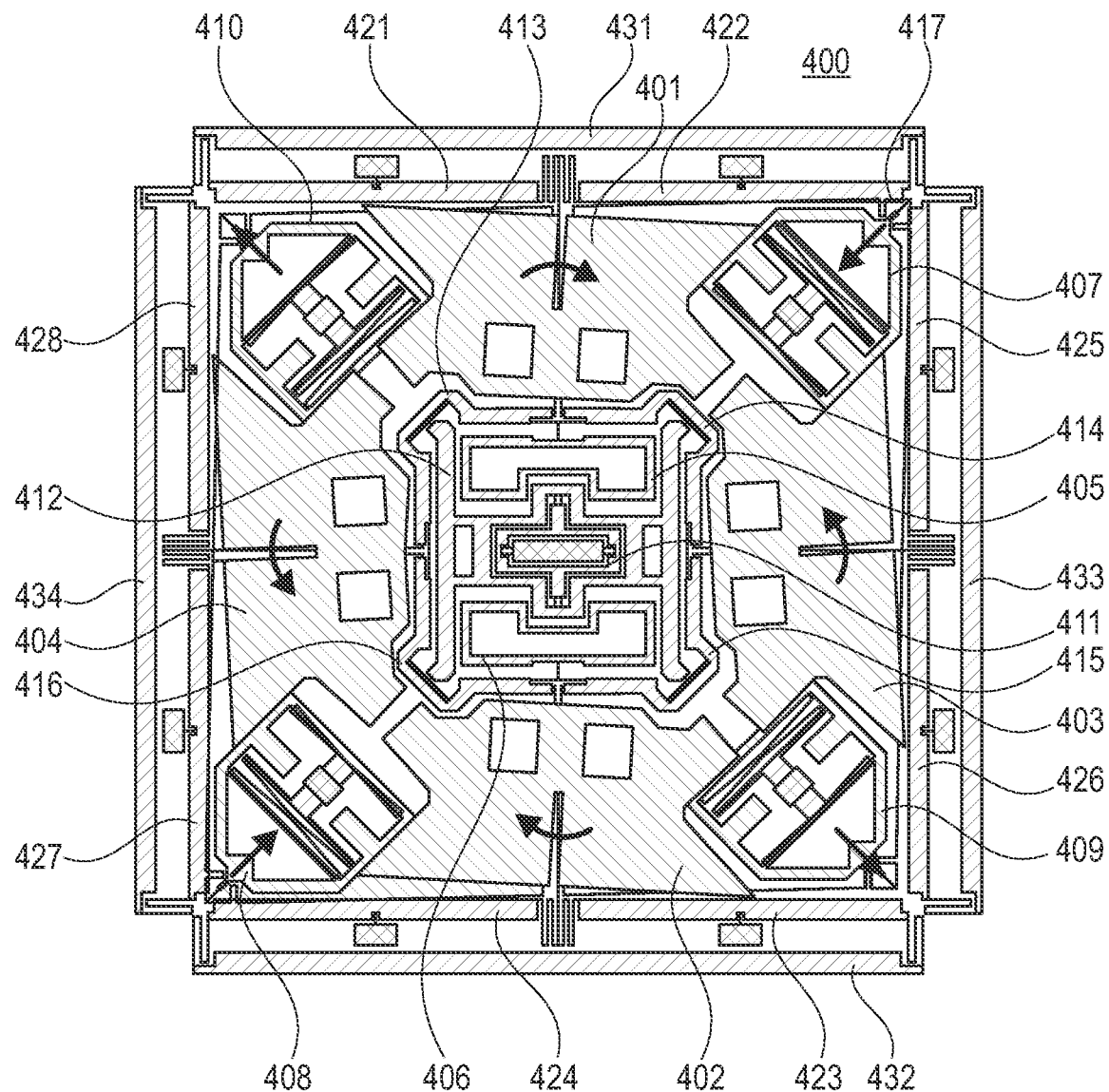
FIG. 11 shows the movement of the structure of the MEMS gyroscope of FIG. 9 in the secondary drive mode.

Movement of the proof masses 401-404 and counter masses 431-434 in the secondary drive mode is shown in more detail in FIG. 11. Since the movement of the proof masses 401-404 in secondary drive mode is uncoupled, or only relatively weakly coupled, to the beams 421-428, the beams 421-428 and counter masses 431-434 do not move in the secondary drive mode.

Figure 12A:
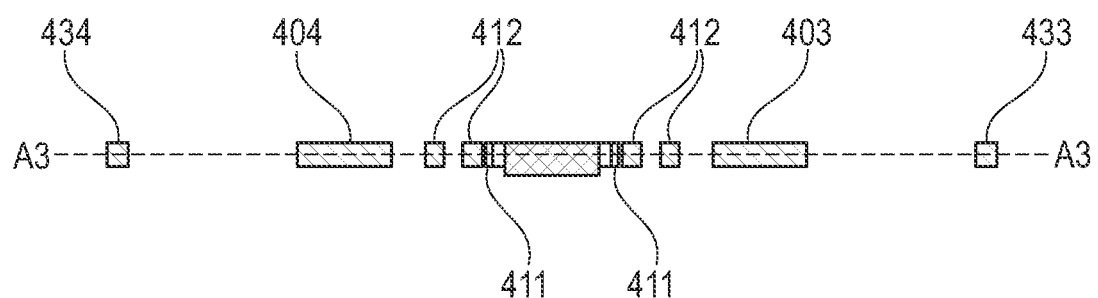
FIGS. 12A and 12B show the movement of the structure of the MEMS gyroscope of FIG. 9 in the sense mode.
Figure 12B:
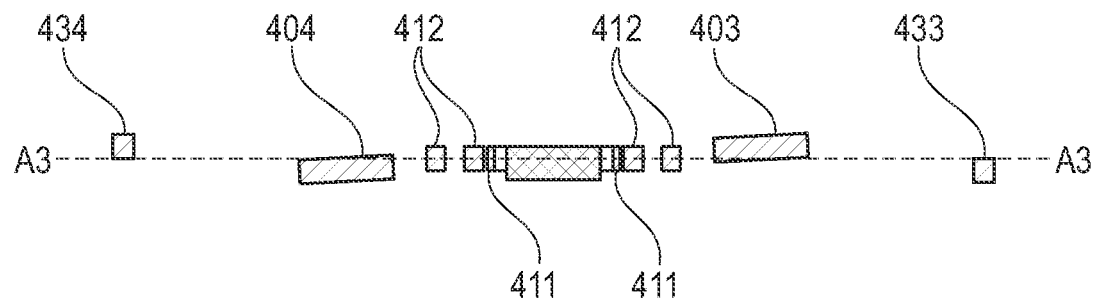

Movement of the proof masses 401-404 and counter masses 431-434 in the sense mode is shown in more detail in FIGS. 12A and 12B, which show cross-sectional views of the MEMS gyroscope 400 along line A3-A3 shown in FIG. 1. In FIG. 12A, the MEMS gyroscope is at rest. In FIG. 12B, the proof masses 401-404 and counter masses 431-434 are oscillating in the sense mode due to an external angular rate applied to the MEMS gyroscope 400 while the proof masses are driven to oscillate in the primary and secondary drive modes. As each proof mass 401-404 oscillates out of the component plane of the MEMS gyroscope 400, the connected intermediate beams 421-428 are driven to rotate out of the component plane about the pivotal connection to the substrate. Therefore, as the end of each intermediate beam 421-428 that is connected to the proof mass 401-404 moves upwards from the component plane, the end that is connected to the counter mass 431-434 moves downwards and vice versa. In this way, the movement of each counter mass 431-434 in the sense mode is coupled in antiphase with the movement of corresponding proof mass 401-404 via the beams 421-428.

Figure 13:
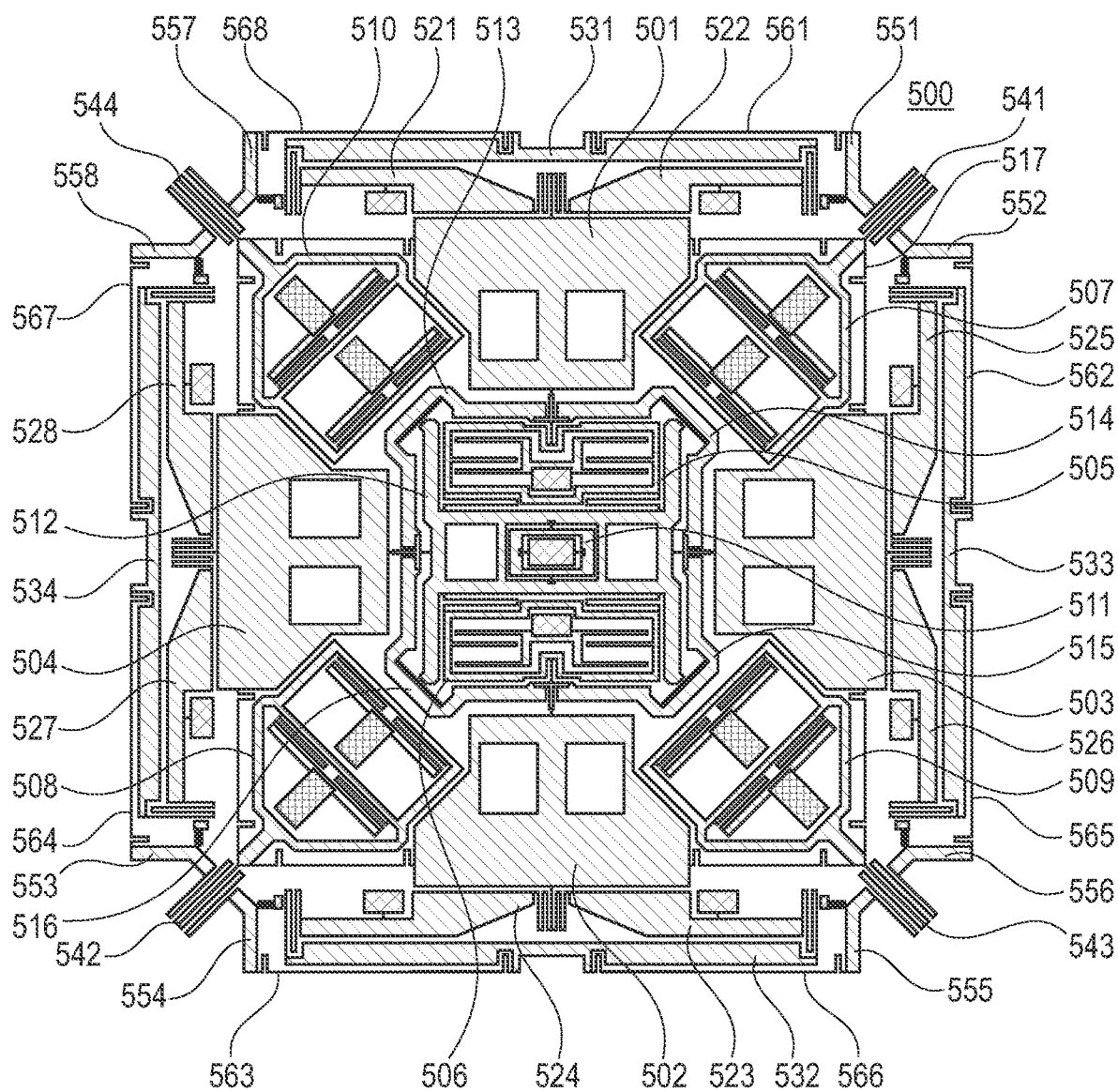
FIG. 13 shows the structure of a MEMS gyroscope according to a fourth embodiment of the invention.

FIG. 13 shows a MEMS gyroscope 500 according to a fourth embodiment of the invention. The MEMS gyroscope 500 corresponds to the MEMS gyroscope 100 of the first embodiment, with the addition of counter masses 531-534 which oscillate in antiphase with the proof masses 501-504 in the primary drive mode, secondary drive mode and sense mode. The MEMS gyroscope 500 can also be considered to correspond to the MEMS gyroscope 400 of the third embodiment, with the addition of a secondary drive frame, which connects to the secondary drive actuators 507-510 to the counter masses 531-534 to drive oscillation of the counter masses 531-534 along axes parallel to the motion of the corresponding proof masses 501-504 in the secondary drive mode. The secondary drive frame is made up of folded beam springs 541-544, each of which is connect to two levers 551-558, each of which is connected to one of the proof masses 501-504 by springs 561-568. These springs 561-568 connecting the levers 551-558 to the proof masses 501-504 may be individual springs connecting each lever 551-558 to one proof mass 501-504, as shown in the drawings, or alternatively a single spring may be run between two levers 551-558 and be connected to the proof mass 501-504 at a point between the two levers 551-558.

Figure 14:
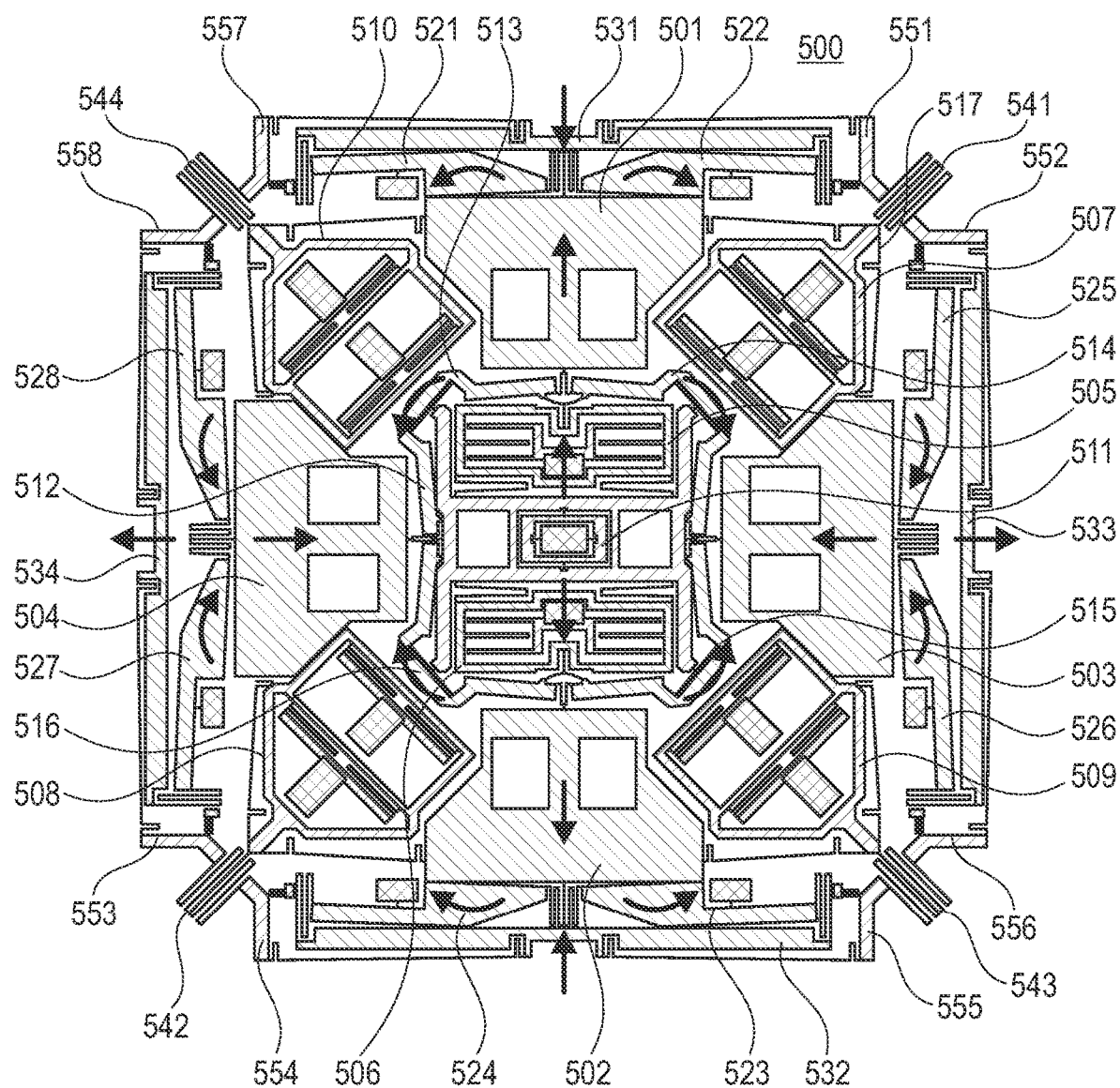
FIG. 14 shows the movement of the structure of the MEMS gyroscope of FIG. 13 in the primary drive mode.

In the primary drive mode and sense mode, the counter masses 531-534 and intermediate beams 521-528 move as described above with respect to the counter masses 431-434 and intermediate beams 421-428 of MEMS gyroscope 400. Movement of the mechanical components of the MEMS gyroscope 500 in the primary drive mode is shown in FIG. 14.

In the secondary drive mode, each counter mass 531-534 oscillates tangentially relative to a radial axis extending from the centre of mass of the MEMS gyroscope 500 and in antiphase with the corresponding proof mass 501-504. The axis of oscillation of each counter mass 531-534 is parallel to the axis along which the corresponding proof mass 510-504 moves in the secondary drive mode.

The secondary drive frame can be broken down in four secondary drive frame subsections, each subsection including a folded beam spring 541-544 connected at its centre to one of the secondary drive actuators 507-510, two levers 551-558 connected at a first end to different ends of the folded beam spring and pivotally connected to the substrate, and two spring connectors, each connected at a first end to a second end of one of the levers 551-558 and at a second end to the one of the counter masses 531-534. Each secondary drive frame subsection has mirror symmetry about a radial axis that extends through the centre of mass of the MEMS gyroscope 500 and the centre of the secondary drive actuator 507-510 to which the secondary drive frame subsection is connected. The levers 551-558 have a bent profile, causing radial movement of the first ends of the levers 551-558 relative to the centre of mass of the MEMS gyroscope 500 to result in movement of the second ends of the levers 551-558 generally along axes parallel to the axes of movement of the proof masses 501-504 in the secondary drive mode.

The counter masses 531-534 are generally beam shaped and can be considered to lie on the edges of an imaginary square extending around the other mechanical components of the MEMS gyroscope 500. Each secondary drive frame subsection is located at one of the vertices of the imaginary square and is connected to the counter masses 531-534 that are adjacent to that vertex.

Figure 15:
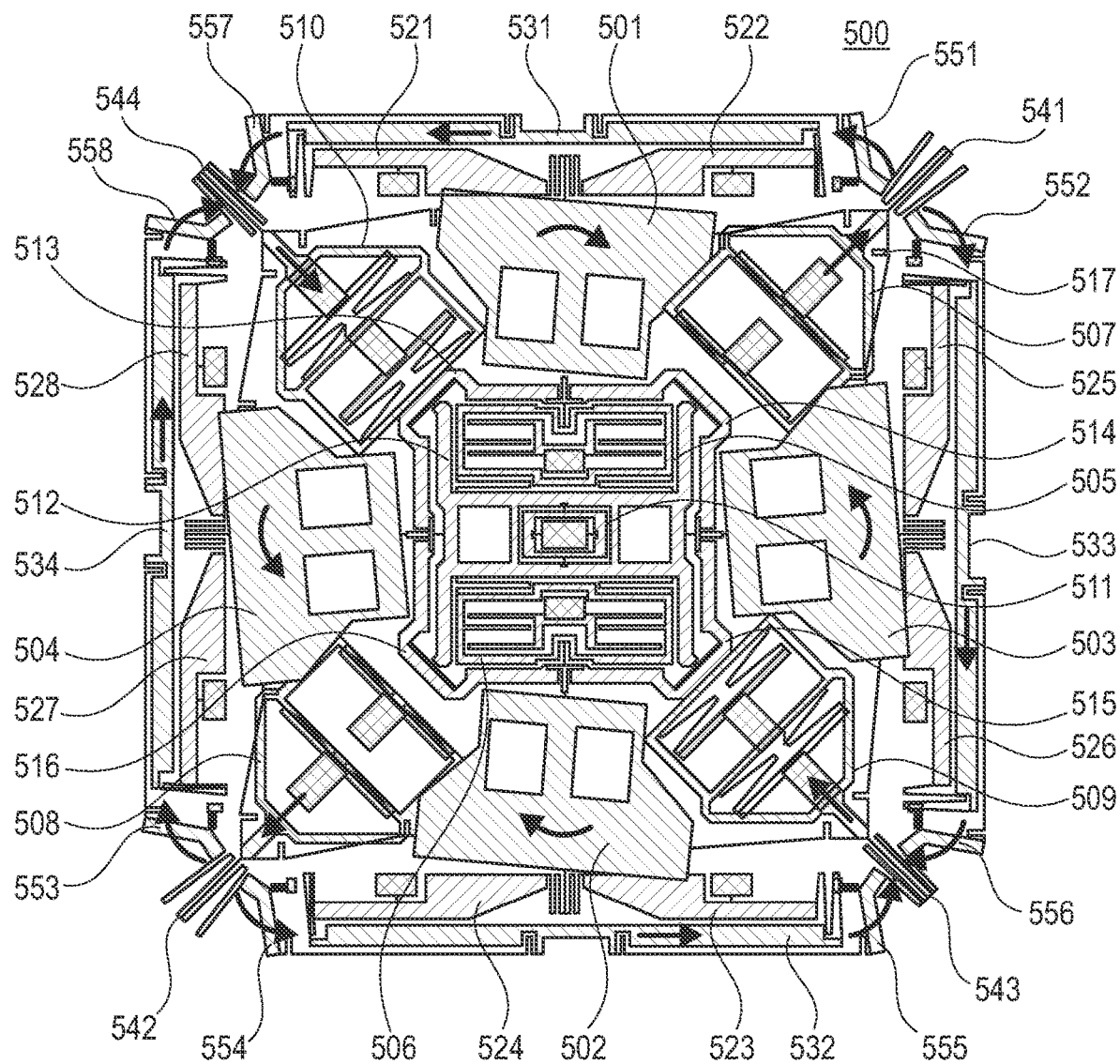
FIG. 15 shows the movement of the structure of the MEMS gyroscope of FIG. 14 in the secondary drive mode.

Movement of the mechanical components of the MEMS gyroscope 500 in the secondary drive mode is shown in more detail in FIG. 15. Movement of each secondary drive actuator 507-510 radially outwards with respect to the centre of mass of the MEMS gyroscope 500 causes the second ends of the levers 551-554 of the connected secondary drive frame subsection to rotate away from the folded beam spring 541-544, causing the spring connectors and counter masses 531-534 connected to the spring connector to move away from the folded beam spring. The shape of the folded beam springs 541-544 and the pivotal attachment of the levers 551-558 to the substrate causes the folder beam springs 541-544 to fan outwards, as shown in FIG. 15, as the secondary drive actuators 507-510 move outwards and causes the first ends of the levers 551-558, which are connected to the folded beam springs, to move radially outwards and the second ends of the levers 551-558, the spring connectors and the counter masses 531-534 to move away from the folded beam spring 541-544 along the edges of the imaginary square, i.e. perpendicular to the radial axes extending through the centre of mass along which the proof masses 501-504 move in the primary drive mode and parallel to the axes along which the proof masses 501-504 move in the secondary drive mode.

Conversely, movement of each secondary drive actuator 507-510 radially inwards causes the second ends of the levers 551-558 of the connected secondary drive frame subsection to rotate towards the folded beam spring 541-544, causing the spring connectors and counter masses 531-534 connected to the spring connectors to move towards the folded beam spring 541-544.

The invention claimed is:

1. A MEMS gyroscope, comprising:
at least one proof mass connected to a substrate of the MEMS gyroscope via one or more intermediate structures;
a drive circuitry configured to simultaneously drive oscillation of the at least one proof mass in a primary drive mode at a first frequency for detecting angular rate about a first sense axis, and in a secondary drive mode at a second frequency for detecting angular rate about a second sense axis, wherein the primary drive mode and secondary drive mode are orthogonal;
a sense circuitry configured to measure oscillation of the at least one proof mass in a sense mode, wherein the sense mode is orthogonal to the primary drive mode and the secondary drive mode; and
a demodulation circuitry configured to obtain two rate signals from a signal obtained by the sense circuitry by measuring the oscillation in the sense mode, wherein the two rate signals are obtained by demodulating the signal using the first frequency and the second frequency;
wherein the first frequency is different to the second frequency, and wherein the signal measured by the sense circuitry includes simultaneously angular rate information of both the first sense axis and the second sense axis.

2. The MEMS gyroscope of claim 1, wherein the MEMS gyroscope is configured to output a first rate signal corresponding to the rate of rotation of the MEMS gyroscope around a primary axis, which is parallel to the primary drive mode, and a second rate signal corresponding to the rate of rotation of the MEMS gyroscope around a secondary axis, which is parallel to the secondary drive mode.

3. The MEMS gyroscope of claim 2, wherein:
the first rate signal is proportional to amplitude of oscillation of the at least one proof mass in the sense mode at the second frequency; and
the second rate signal is proportional to amplitude of oscillation of the at least one proof mass in the sense mode at the first frequency.

4. The MEMS gyroscope of claim 3, wherein the demodulation circuitry is configured to demodulate the measured oscillation of the at least one proof mass in the sense mode to determine the amplitude of oscillation of the at least one proof mass at the first and second frequencies.

5. The MEMS gyroscope of claim 1, wherein the at least one proof mass comprises a first proof mass, a second proof mass, a third proof mass and a fourth proof mass, wherein:
the first and second proof masses are positioned on opposite sides of the centre of mass of the MEMS gyroscope;
the third and fourth proof masses are positioned on opposite sides of the centre of mass of the MEMS gyroscope;
the first, second, third and fourth proof masses are arranged around the centre of mass of the MEMS gyroscope at 90-degree intervals; and
in the primary drive mode, the first, second, third and fourth proof masses are configured to move radially relative to the centre of mass of the MEMS gyroscope.

6. The MEMS gyroscope of claim 5, wherein, in the primary drive mode:
the radial motion of the first proof mass and the radial motion of the second proof mass are in phase;
the radial motion of the third proof mass and the radial motion of the fourth proof mass are in phase; and
the radial motion of the first proof mass and the radial motion of the second proof mass are in antiphase with the radial motion of the third proof mass and the radial motion of the fourth proof mass.

7. The MEMS gyroscope of claim 5, wherein the radial axes along which each of the first, second, third and fourth proof masses move in the primary drive mode are configured at 90 degree intervals around the center of mass of the MEMS gyroscope.

8. The MEMS gyroscope of claim 5, wherein the drive circuitry comprises a first primary drive actuator and a second primary drive actuator and the one or more intermediate structures comprise a plurality of levers, wherein:
the first primary drive actuator and second primary drive actuator are positioned on opposite sides of the center of mass of the MEMS gyroscope and between the first proof mass and the second proof mass;
the first primary drive actuator and second primary drive actuator are connected to the first and second proof masses such that actuation of the first primary drive actuator and second primary drive actuator drives radial oscillation of the first proof mass and second proof mass in-phase with the movement of the first primary drive actuator and second primary drive actuator; and the first primary drive actuator and second primary drive actuator are connected to the third and fourth proof masses via a plurality of levers such that actuation of the first primary drive actuator and second primary drive actuator drives radial oscillation of the third and fourth proof masses in antiphase with the movement of the first primary drive actuator and second primary drive actuator.

9. The MEMS gyroscope of claim 8, wherein the first primary drive actuator and second primary drive actuator are connected to the first and second proof masses via the plurality of levers.

10. The MEMS gyroscope of claim 8, wherein the drive circuitry is configured to drive actuation of the first primary drive actuator in-phase with actuation of the second primary drive actuator such that the radial movement of the first primary drive actuator is in-phase with the radial movement of the second primary drive actuator.

11. The MEMS gyroscope of claim 8, wherein the plurality of levers comprises four levers and wherein:
each lever of the four levers comprises two perpendicular straight sections and the four levers are positioned around the first and second primary drive actuators such that, at rest, each lever of the four levers lies at a different vertex of a rectangle or square surrounding the first and second primary drive actuators and the two perpendicular sections of each lever lie on the edges of the rectangle or square;
the one or more intermediate structures further comprises a gimbal structure via which each lever of the four levers is pivotally connected to the substrate at a point between the two perpendicular straight sections of the lever, such that rotation of each lever causes the distal end of one of the perpendicular straight sections of the lever to move radially outwards and the distal end of the other perpendicular straight section of the lever to move radially inwards;
each lever of the four levers is connected to each of its adjacent levers by a spring which couples radial motion of the distal ends of the perpendicular straight sections of adjacent levers;
the first primary drive actuator is connected to a first lever and a second lever of the four levers such that movement of the first primary drive actuator causes the first lever and second lever to rotate in opposite directions; and
the second primary drive actuator is connected to a third lever and a fourth lever of the four levers such that movement of the second primary drive actuator causes the third lever and fourth lever to rotate in opposite directions.

12. The MEMS gyroscope of claim 11, wherein the gimbal structure comprises an inner gimbal and an outer gimbal, wherein:
the inner gimbal is connected to the substrate and allows rotation of components connected to the inner gimbal relative to the substrate along a first component rotation axis;
the outer gimbal is connected to the inner gimbal and allows rotation of components connected to the outer gimbal relative to the inner gimbal along a second component rotation axis, perpendicular to the first component rotation axis;
at rest, the first and second component rotation axes are parallel to the substrate; and
the four levers are connected to the outer gimbal structure such that the four levers and first, second, third and fourth proof masses are free to rotate about the first component rotation axis and second component rotation axis.

13. The MEMS gyroscope of claim 11, wherein:
the first and second levers are connected to the first proof mass;
the third and fourth levers are connected to the second proof mass;
the second and third levers are connected to the third proof mass; and
the first and fourth levers are connected to the fourth proof mass.

14. The MEMS gyroscope of claim 13, wherein the levers are connected to the proof masses at the distal ends of the perpendicular straight sections of the levers closest to the proof mass.

15. The MEMS gyroscope of claim 5, wherein in the secondary drive mode:
the first, second, third and fourth proof masses are configured to move essentially tangentially relative to the center of mass of the MEMS gyroscope;
the tangential motion of the first proof mass and the tangential motion of the second proof mass are in phase;
the tangential motion of the third proof mass and the tangential motion of the fourth proof mass are in phase; and
the tangential motion of the first proof mass and the tangential motion of the second proof mass is in antiphase with the tangential motion of the third proof mass and the tangential motion of the fourth proof mass.

16. The MEMS gyroscope of claim 15, wherein the circuitry comprises four secondary drive actuators and at least one secondary drive connector, wherein:
the four secondary drive actuators are arranged around the center of mass of the MEMS gyroscope at 90-degree intervals such that one of the four secondary drive actuators is positioned between each pair of the first, second, third and fourth proof masses; and
the at least one secondary drive connector connects each of the four secondary drive actuators to the adjacent ones of the first, second, third and fourth proof masses.

17. The MEMS gyroscope of claim 16, wherein:
the four secondary drive actuators are configured to move radially;
the drive circuitry is configured to drive radial motion of a first secondary drive actuator of the four secondary drive actuators in-phase with radial motion a second secondary drive actuator of the four secondary drive actuators;
the drive circuitry is configured to drive radial motion of a third secondary drive actuator of the four secondary drive actuators in-phase with radial motion a fourth secondary drive actuator of the four secondary drive actuators; and
the drive circuitry is configured to drive radial motion of the first and second secondary drive actuators in antiphase with the radial motion of the third and fourth secondary drive actuators.

18. The MEMS gyroscope of claim 17, wherein:
the first secondary drive actuator and second secondary drive actuator are positioned on opposite sides of the center of mass of the MEMS gyroscope; and
the third secondary drive actuator and fourth secondary drive actuator are positioned on opposite sides of the center of mass of the MEMS gyroscope.

19. The MEMS gyroscope of claim 5, wherein in the sense mode:
the first and second proof masses define a first sense mode plane, which is capable of rotation out of parallel with the component plane of the MEMS gyroscope about a first sense rotation axis which passes through the center of mass of the MEMS gyroscope; and
the third and fourth proof masses define a second sense mode plane, which is capable of rotation out of parallel with the component plane of the MEMS gyroscope about a second sense rotation axis which passes through the center of mass of the MEMS gyroscope.

20. The MEMS gyroscope of claim 19, wherein:
the first sense rotation axis is coaxial with the radial axis along which the third and fourth proof masses move in the first sense mode; and
the second sense rotation axis is coaxial with the radial axis along which the first and second proof masses move in the first sense mode.

* * * * *